US008655946B2

(12) United States Patent
Hamada et al.

(10) Patent No.: US 8,655,946 B2
(45) Date of Patent: Feb. 18, 2014

(54) AUTHENTICATING METHOD, CONVERSION DEVICE, AND RELAY DEVICE

(75) Inventors: Kei Hamada, Fukuoka (JP); Takao Ogura, Kawasaki (JP); Hitoshi Ueno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 341 days.

(21) Appl. No.: 12/970,549

(22) Filed: Dec. 16, 2010

(65) Prior Publication Data

US 2011/0154457 A1 Jun. 23, 2011

(30) Foreign Application Priority Data

Dec. 21, 2009 (JP) ................................. 2009-288602

(51) Int. Cl.
*G06F 15/16* (2006.01)
(52) U.S. Cl.
USPC .......................................... 709/203; 709/227
(58) Field of Classification Search
USPC .................................................. 709/203, 227
See application file for complete search history.

(56) References Cited

U.S. PATENT DOCUMENTS

| 6,073,172 | A  | * | 6/2000  | Frailong et al. ............... 709/222 |
|-----------|----|---|---------|----------------------------------------|
| 7,840,699 | B2 |   | 11/2010 | Fujita et al.                          |
| 7,899,441 | B2 | * | 3/2011  | Zhang .......................... 455/411 |
| 2001/0000358 | A1 |   | 4/2001 | Isomichi et al.                        |
| 2005/0169288 | A1 | * | 8/2005 | Kamiwada et al. ........... 370/401     |
| 2008/0147842 | A1 |   | 6/2008 | Mohri et al.                           |
| 2009/0037998 | A1 | * | 2/2009 | Adhya et al. ..................... 726/11 |
| 2009/0240874 | A1 | * | 9/2009 | Pong .............................. 711/105 |

FOREIGN PATENT DOCUMENTS

| JP | 2000-003334   |   | 1/2000 |
|----|---------------|---|--------|
| JP | 2002-278931   | A | 9/2002 |
| JP | 2003-32281    | A | 1/2003 |
| JP | 2003-044508   |   | 2/2003 |
| JP | 2004-266568   | A | 9/2004 |
| JP | 2006-031522   | A | 2/2006 |
| JP | 2007-041651   |   | 2/2007 |
| JP | 2008-152368   |   | 7/2008 |

OTHER PUBLICATIONS

Yu Enokibori, et al., "Automatica Network Tunneling for Collaboration among Network-Separated Services", DICOMO2008, Jul. 2008. (with English-language Abstract).

* cited by examiner

*Primary Examiner* — Asghar Bilgrami
(74) *Attorney, Agent, or Firm* — Fujitsu Patent Center

(57) ABSTRACT

A conversion device receives service data including first connection destination data and the authentication information about an authenticated user, generates second connection destination data for designation of the first connection destination data, then associates the authentication information, the first and second connection destination data with one another, transmits them to a relay device, and transmits to a client the service data in which the first connection destination data is replaced with the second connection destination data; the client transmits the second connection destination data selected by the user to the relay device; the relay device transmits the authentication information to a server indicated by the first connection destination data using the authentication information and the first connection destination data corresponding to the second connection destination data, and transmits the address of the server to the client; and the client communicates with the server using the address and the authentication information.

4 Claims, 32 Drawing Sheets

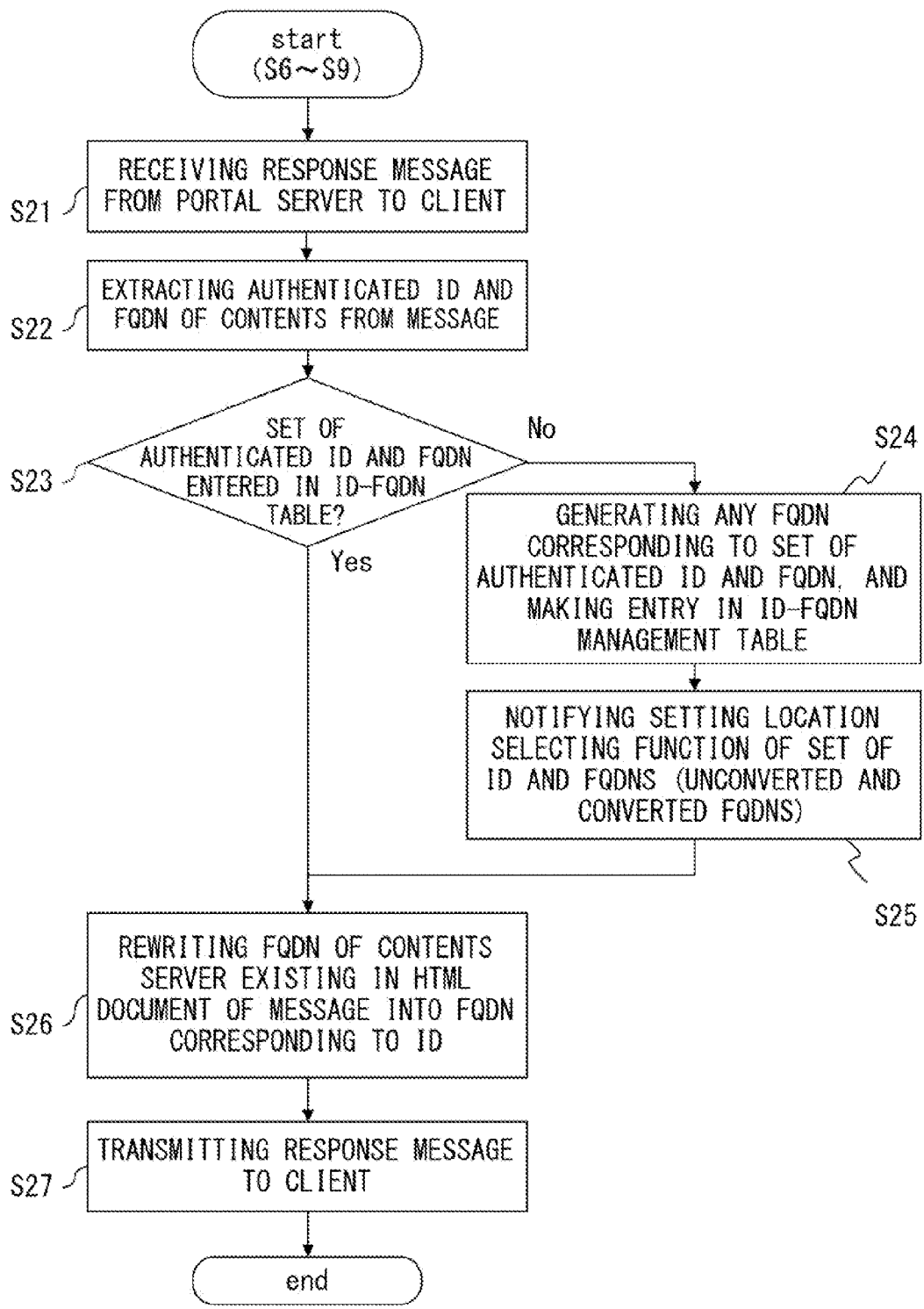
F I G. 9

| HTTP HEADER FIELD NAME | OPTION |
|---|---|
| Set-Cookie | NAME==Authe |

| HTML DOCUMENT REWRITTEN LOCATION | ~ 27 |
| --- | --- |
| //a/@href | |

FIG. 12

| AUTHENTICATED ID | UNCONVERTED FQDN | CONVERTED FQDN |
|---|---|---|
| abc123 | srv1.example.com | aaa.example.com |
| 98765432 | srv2.example.com | bbb.example.com |

~ 44

F I G. 1 3

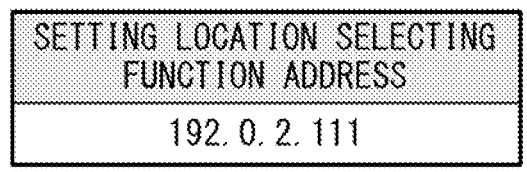
F I G. 1 4

AUTHENTICATED ID : 1 2 3 4 5
UNCONVERTED FQDN : srv1.example.com
CONVERTED FQDN : ccc.example.com
~ 60

FIG. 15

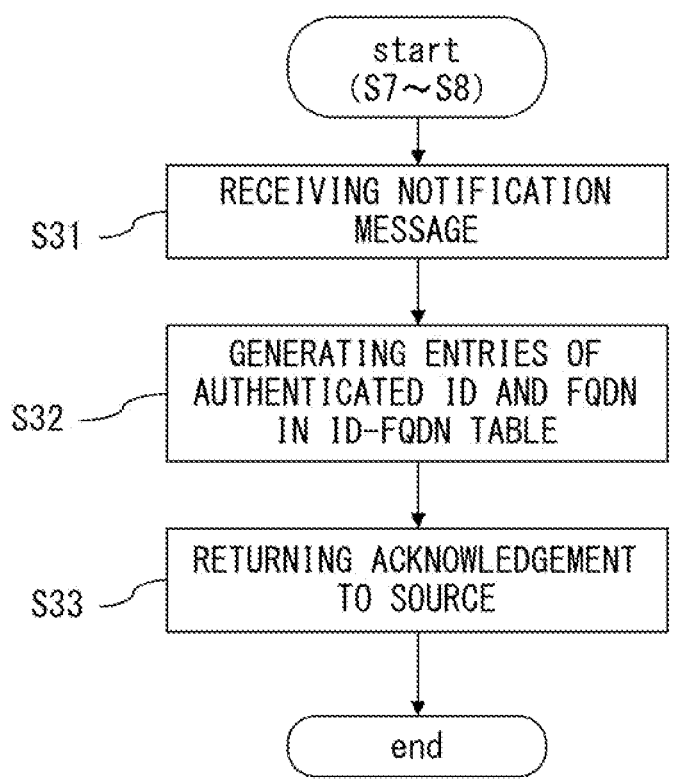
F I G. 16

F I G. 17

| CONVERTED FQDN | UNCONVERTED FQDN |
|---|---|
| aaa.example.com | srv1.example.com |
| bbb.example.com | srv2.example.com |
| ccc.example.com | srv1.example.com |

~ 25

F I G. 1 8

| AUTHENTICATED ID | IP ADDRESS |
|---|---|
| abc123 | 10.10.10.10 |
| 98765432 | 192.168.0.254 |

~ 33

F I G. 2 0

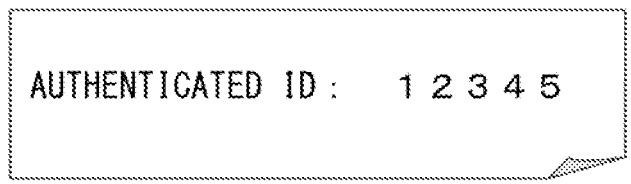
F I G. 21

AUTHENTICATED ID : 1 2 3 4 5 ~ 80
EXPIRATION DATE : 2009/9/11

| AUTHENTICATED ID | UNCONVERTED FQDN | CONVERTED FQDN | EXPIRATION DATE |
|---|---|---|---|
| abc123 | srv1.example.com | aaa.example.com | 2009/9/11 |
| 98765432 | srv2.example.com | bbb.example.com | 2009/10/10 |
| 12345 | NO ENTRY | NO ENTRY | 2009/9/11 |

```
AUTHENTICATED ID :   1 2 3 4 5
UNCONVERTED FQDN :   srv1.example.com
CONVERTED FQDN :     ccc.example.com
EXPIRATION DATE :    2009/9/11
```
~ 60a

FIG. 27

| AUTHENTICATED ID | CONVERTED FQDN | EXPIRATION DATE |
|---|---|---|
| abc123 | aaa.example.com | 2009/9/11 |
| 98765432 | bbb.example.com | 2009/10/10 |
| 12345 | ccc.example.com | 2009/9/11 |

~ 26a

F I G. 2 8

| CONVERTED FQDN | UNCONVERTED FQDN | EXPIRATION DATE |
|---|---|---|
| aaa.example.com | srv1.example.com | 2009/9/11 |
| bbb.example.com | srv2.example.com | 2009/10/10 |
| ccc.example.com | srv1.example.com | 2009/9/11 |

~ 25a

F I G. 2 9

| AUTHENTICATED ID | IP ADDRESS | EXPIRATION DATE |
|---|---|---|
| abc123 | 10.10.10.10 | 2009/9/11 |
| 98765432 | 192.168.0.254 | 2009/10/10 |

AUTHENTICATED ID :   1 2 3 4 5     ~ 61a
EXPIRATION DATE :   2009/9/11

F I G. 3 1

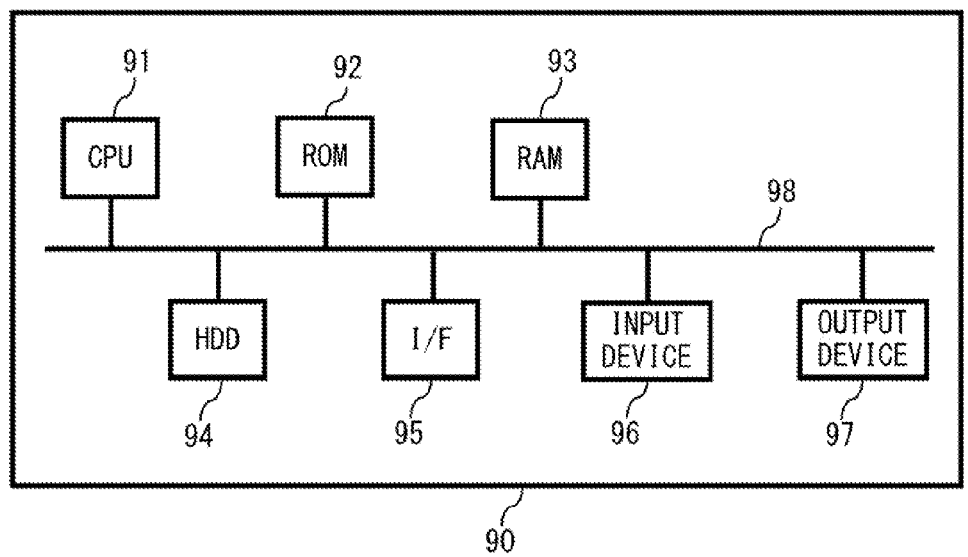
F I G. 3 2

AUTHENTICATING METHOD, CONVERSION DEVICE, AND RELAY DEVICE

CROSS-REFERENCE TO RELATED APPLICATIONS

This application is based upon and claims the benefit of priority of the prior Japanese Patent Application No. 2009-288602, filed on Dec. 21, 2009, the entire contents of which are incorporated herein by reference.

FIELD

The present specification relates to the technology of access control between a client and a server.

BACKGROUND

Recently, with the progress of information processing technology including network technology etc., the technology relating to controlling access from a client to a server has also made an outstanding progress. For example, there is the following login managing method as the technology relating to the access control. In this method, a user inputs the information for authentication, and logs into the first site on the network. After the login, a login to the second site is attempted by tracing the link from the first site. In this case, in the first site, the information for authentication is added to the address for access to the second site, and provided for the access.

In addition, there is, for example, the following DNS (domain name system) server as a technique relating to access control. According to the information included in a name solution request message, the DNS server acquires the attribute information about a user as a transmitter not included in the name solution request message, and solves the name according to the attribute information.

There is also the following technology as the technology relating to access control. The DNS server stores user identification information for access to a plurality of IP addresses and each IP address associated with a host name. An address designation unit refers to the stored information, designates the IP address associated with the user from the identification information about the user and the host name, and transmits a reply to the user.

SUMMARY

In the authenticating method according to an embodiment of the present invention, a conversion device receives service data which includes first connection destination data and authentication information about an authenticated user, and is transmitted to the authenticated user. The conversion device generates second connection destination data which designates the first connection destination data. The conversion device associates the authentication information about the authenticated user, the first connection destination data, and the second connection destination data with one another, and transmits them to a relay device. The relay device associates the authentication information about the authenticated user, the first connection destination data, and the second connection destination data with one another, and stores them in a storage device. The conversion device transmits the service data in which the first connection destination data is replaced with the second connection destination data to a client device operated by the authenticated user. The client device transmits the replaced service data and the second connection destination data selected by the operation of the user to the relay device. The relay device extracts from the storage unit the authentication information and the first connection destination data and second connection destination data received from the conversion device and corresponding to the second connection destination data transmitted from the client device. The relay device transmits the extracted authentication information to the server device indicated by the extracted first connection destination data. The relay device transmits the address of the server device to the client device. The client device communicates with the server device using the address and the authentication information.

The conversion device according to the present embodiment includes a reception unit, a generation unit, and a transmission unit. The reception unit receives service data which includes the first connection destination data and the authentication information about the authenticated user, and is to be transmitted to the authenticated user. The generation unit generates the second connection destination data designating the first connection destination data. The transmission unit associates the authentication information about the authenticated user, the first connection destination data, and the second connection destination data with one another, transmits them to the relay device, and transmits the service data in which the first connection destination data is replaced with the second connection destination data to the client device operated by the authenticated user.

The relay device according to the present embodiment includes a reception unit, a storage unit, an extraction unit, and a transmission unit. The reception unit receives from the conversion device the authentication information about an authenticated user, the first connection destination data, and the second connection destination data, and receives the second connection destination data selected by the operation of a user from the client device operated by the user. The storage unit associates the second connection destination data, the authentication information, and the first connection destination data received from the conversion device with one another and stores them. The extraction unit extracts from the storage unit the authentication information and the first connection destination data received from the conversion device and corresponding to the second connection destination data received from the client device. The transmission unit transmits the extracted authentication information to the server device indicated by the extracted first connection destination data, and transmits the address of the server device to the client device.

BRIEF DESCRIPTION OF DRAWINGS

FIG. 9 is a flowchart of the process of the mapping function 40 when a response message for providing resources such as a list of contents is received;

FIG. 11 is an example of ID storage location definition information 28;

FIG. 12 is an example of rewrite location definition information 27;

FIG. 13 is an example of an ID-FQDN management table 44;

FIG. 14 is an example of a setting location selecting function address;

FIG. 15 is an example of a notification message transmitted from the mapping function to the setting location selecting function;

FIG. 16 is a detailed flowchart of the operation (S7 and S8) of the setting location selecting function 30 when a notification message 60 is received from the mapping function 40;

FIG. 17 is an example of an ID-FQDN table 26;

FIG. 18 is an example of an FQDN conversion table 25;

FIG. 20 is an example of an ID address table 33;

FIG. 21 is an example of a setting message 61 transmitted from the setting location selecting function 30 to the access GW3;

FIG. 25 is an example of a notification message 80 for notification of the expiry date of an authenticated ID transmitted from the authentication server 6 to the mapping function 40a;

FIG. 26 is an example of an ID-FQDN management table 44a;

FIG. 27 is an example of a notification message 60a transmitted from the mapping function 40a to the setting location selecting function 30;

FIG. 28 is an example of an ID-FQDN table 26a;

FIG. 29 is an example of an FQDN conversion table 25a;

FIG. 30 is an example of an ID address table 33a;

FIG. 31 is an example of a setting message 61a transmitted from the setting location selecting function 30 to the access GW3; and FIG. 32 is an example of the configuration of the hardware of a computer for realizing the function of each unit of the gateway device including the mapping function 40, 40a, or the setting location selecting function 30.

DESCRIPTION OF EMBODIMENTS

In the present embodiment, provided is an authenticating method for reducing the frequency of setting the authentication information for a server device when the authentication information is generated, and setting the authentication information independent of the number of server devices.

Described below is the access control technology of relaying or interrupting a request message from a client to a server depending on whether or not the client is authenticated.

Figure 1:
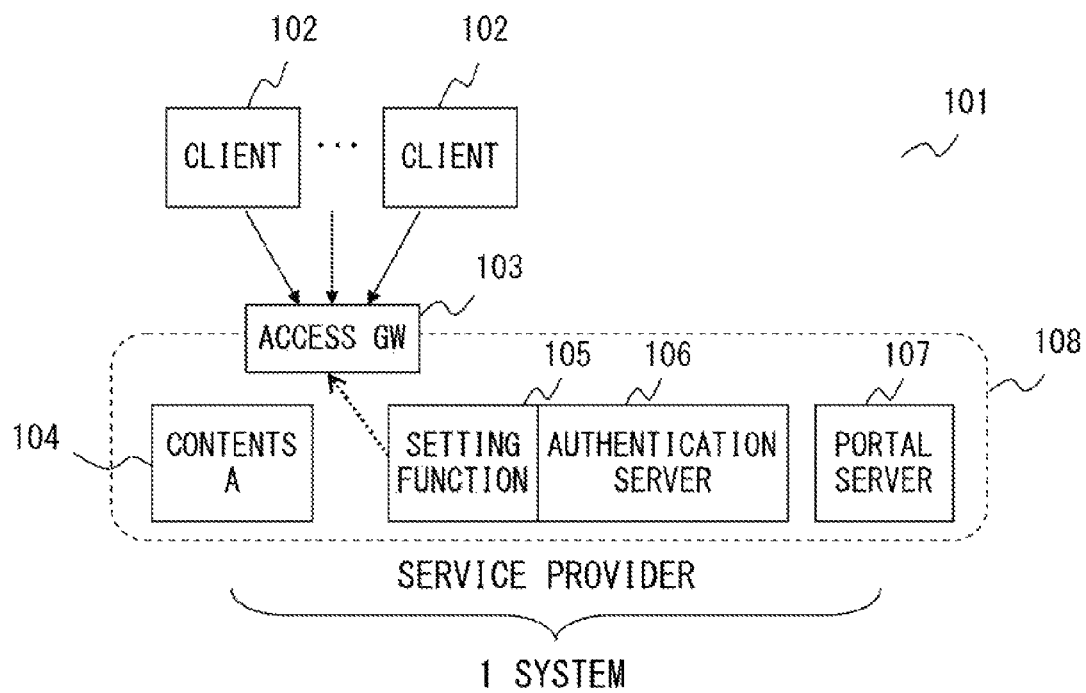
FIG. 1 is an example of an access control system 101 closed in a system of one service provider 108.

FIG. 1 is an example of the access control system 101 closed in a system of one service provider 108. The access control system 101 includes an access gateway (hereinafter referred to as an "access GW") 103 and a setting function 105. In FIG. 1, the service provider 108 further includes a contents server A (104), an authentication server 106, and a portal server 107.

The access GW 103 receives a request to a server from a client 102. When a correct authenticated ID is stored in a request message, the access GW 103 relays the request message to the server. When a correct authenticated ID is not stored in the request message, the access GW 103 interrupts the request. An authenticated ID refers to any character string which is transmitted to the client 102 when the authentication server 106 completes the authenticating process on the client 102, and guarantees for a certain period that the authentication of the client 102 has been completed.

The setting function 105 has the role of setting a correct authenticated ID for the access GW 103, and accepts a notification of an authenticated ID from the authentication server 106. In the access control system 101 closed in the system of the service provider 108 as illustrated in FIG. 1, the setting function 105 sets an authenticated ID for the access GW 103 of the same system.

On the other hand, the mode of a service provider using a CDN (contents delivery network) service to quickly provide a service for a client has attracted attention recently. By the CDN service, the network load of the server (contents server) for providing the contents of a service and from the client to the contents server can be distributed. This is described below with reference to FIG. 2.

Figure 2:
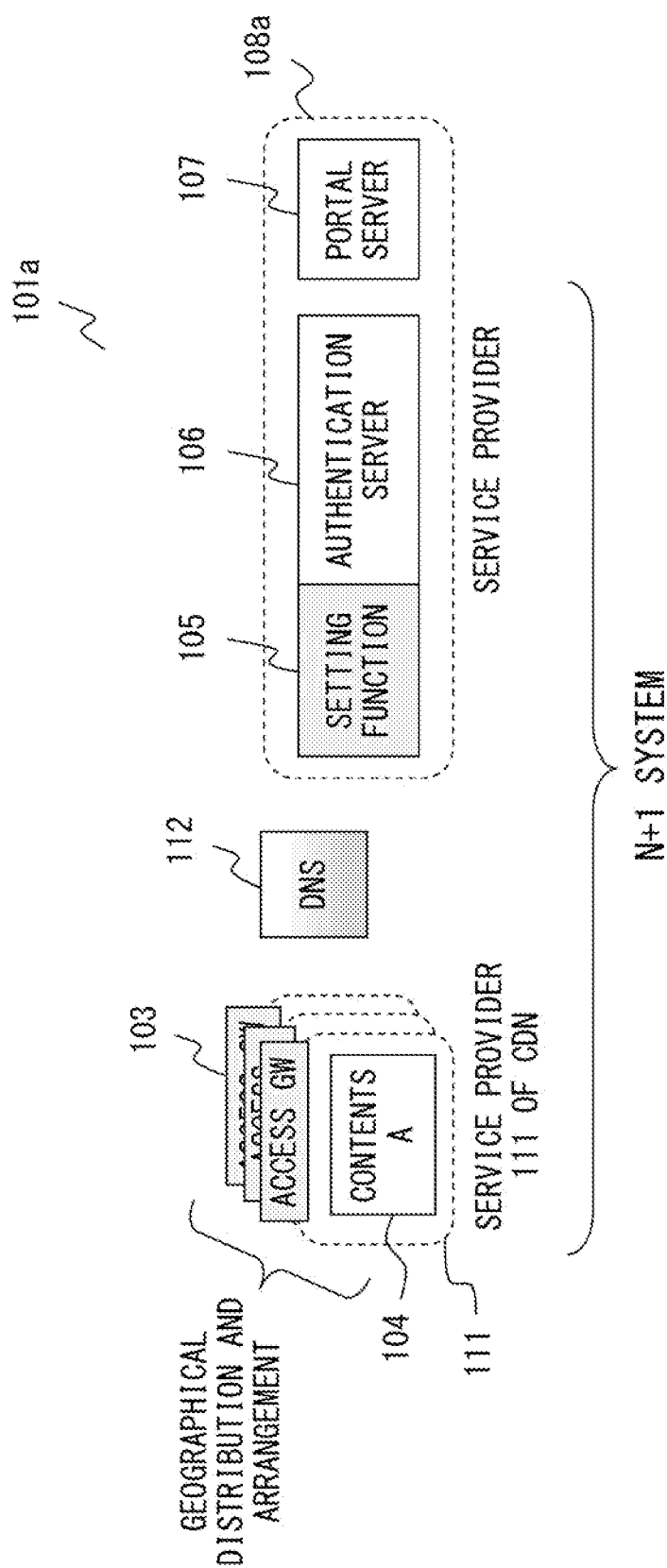
FIG. 2 illustrates an access control system 101a when a service provider 108a uses a CDN service.

FIG. 2 illustrates the access control system 101a when the service provider 108a uses a CDN service. When the service provider 108a uses the CDN service, the contents server 104 is provided in the system of a service provider 111 of the CDN as illustrated in FIG. 2, thereby realizing geographical distribution. Therefore, the access control system 101a includes N geographically distributed systems of the service provider 111 and one system of the service provider 108a.

In this case, when a DNS (domain name system) server 112 allocates a request from the client 102 to the contents server 104, the setting function 105 does not know the access destination of the client 102. Practically, assume that the client 102 transmits an inquiry of the FQDN (fully qualified domain name) of the contents server 104 to the DNS server 112. In this case, the DNS server 112 selects an appropriate IP address from among a plurality of IP addresses of the contents servers 104 depending on the IP address of the client 102 and the state of the load of the contents, and transmits a reply. In this case, a setting function 5 does not know the access destination of the client 102.

In the access control system 101a in FIG. 2, since the setting function 105 does not know the access destination of the client 102, it is necessary to notify all access GWs 103 of the authenticated ID.

Figure 3:
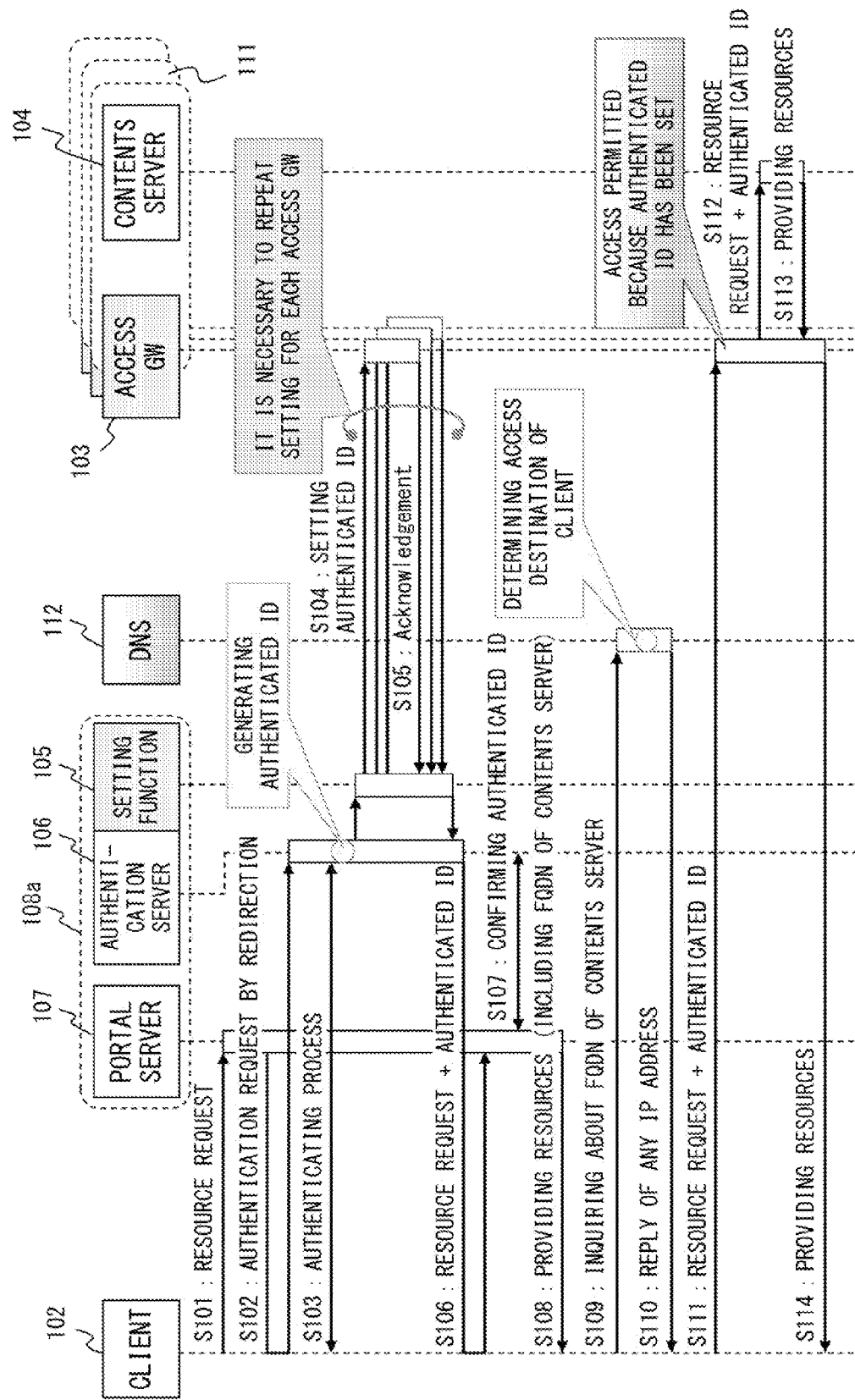
FIG. 3 is an example of the entire sequence of the access control system 101a in FIG. 2.

FIG. 3 is an example of the entire sequence of the access control system 101a in FIG. 2. The client 102 transmits a resource (a list of contents etc.) request message to the portal server 107 (S101). Since the first resource request message does not store an authenticated ID, the portal server 107 transmits to the client 102 a response to transmit a redirection (to access the authentication server 106 (S102). Upon receipt of the response, the client 102 transmits a request to the authentication server 106.

The client 102 performs an authenticating process by transmitting an ID, a password, etc. to the authentication server 106. When the authenticating process is completed, the authentication server 106 generates an authenticated ID (S103).

When the authentication server 106 notifies the setting function 105 of the generated authenticated ID, the setting function 105 sets the authenticated ID (S104). At this time point, the setting function 105 cannot designate the access GW 103 to which the client 102 transmits a request. Therefore, a setting message of the authenticated ID is transmitted to all access GWs 103 for setting the ID.

Upon receipt of the setting message of the authenticated ID, the access GW 103 completes the setting of the authenticated ID and returns an acknowledgement to the setting function 105 (S105). The setting function 105 confirms that the setting of the authenticated ID has been completed in all access GWs 103, and transmits a setting completion notification to the authentication server 106.

The authentication server 106 notifies the client 102 of the authenticated ID whose setting has been completed, and transmits a response message to specify a redirection to the portal server 107 (S106). Upon receipt of the message, the client 102 transmits the request message containing the authenticated ID to the portal server 107.

Upon receipt of the request message containing the authenticated ID, the portal server 107 inquires of the authentication server 106 about the correctness of the authenticated ID (S107).

If the authenticated ID is correct, the portal server 107 provides resources such as a list of contents etc. for the client 102 (S108). The provided resources can be an HTML (HyperText Markup Language) document etc., and include a URL (uniform resource locator) indicating the location of each content. The URL includes the FQDN of each contents server 104.

When a user selects a content to be viewed from a list of contents, the client 102 transmits an inquiry message for the FQDN of the contents server 104 to the DNS server 12 to solve the name of the contents server 104 (S109).

The DNS server 112 selects an appropriate content server 104 based on the source IP address of the client 102 and the load state of the contents server 104, and determines the IP address as a reply to the client 102. Then, the DNS server 112 transmits the determined IP address as a reply message to the inquiry (S110).

The access GW 103 determines a virtual contents server 104 because it is necessary to receive a request to the contents server 104. Therefore, the destination IP address of the request from the client 102 to the contents server 104 is the IP address of the access GW 103. The IP address of the contents server 104 to which the DNS server 112 returns a reply is the IP address of the access GW 103 which determines each virtual contents server 104.

The client 102 defines as a destination IP address the IP address received as a reply from the DNS server 112, and transmits the resource request message of the contents to the destination address (S111). In this case, the client 102 stores the authenticated ID in the message.

The access GW 103 receives the resource request message of the contents. Then, the access GW 103 checks whether or not the authenticated ID in the request message has already entered the list of the set authenticated ID, and confirms the correctness of the authenticated ID (S112). When the authenticated ID is correct, the 103 transfers the request message to the contents server 104.

The contents server 104 returns to the access GW 103 the response message to the resource request message (S113).

The access GW 103 transfers the response message to the client 102 (S114).

In the sequence above, the frequency of setting the authenticated ID for the access GW required when one authenticated ID is generated becomes larger in proportion to the number of the access GWs 103 (number of the contents servers 104 distributed and arranged). Then, to improve the performance of the entire system, the frequency of setting the authenticated ID for the access GW 103 increases each time the numbers of the contents servers 104 and the access GWs 103 increase, thereby failing in acquiring sufficient scalability.

According to the present embodiment, sufficient scalability can be acquired by reducing the frequency of setting the authenticated ID for the access GW when one authenticated ID is generated, and setting the authenticated ID independent of the number of access GWs. The system of the present embodiment is described below.

In the present embodiment, the FQDN of the contents server of which the portal server providing a list of services notifies a client is used. The setting function associates the "client to which the authentication server transmits an authenticated ID" with the "client whose IP address is returned by the DNS server". Thus, the number of the setting location access GWs can be reduced to 1.

Figure 4:
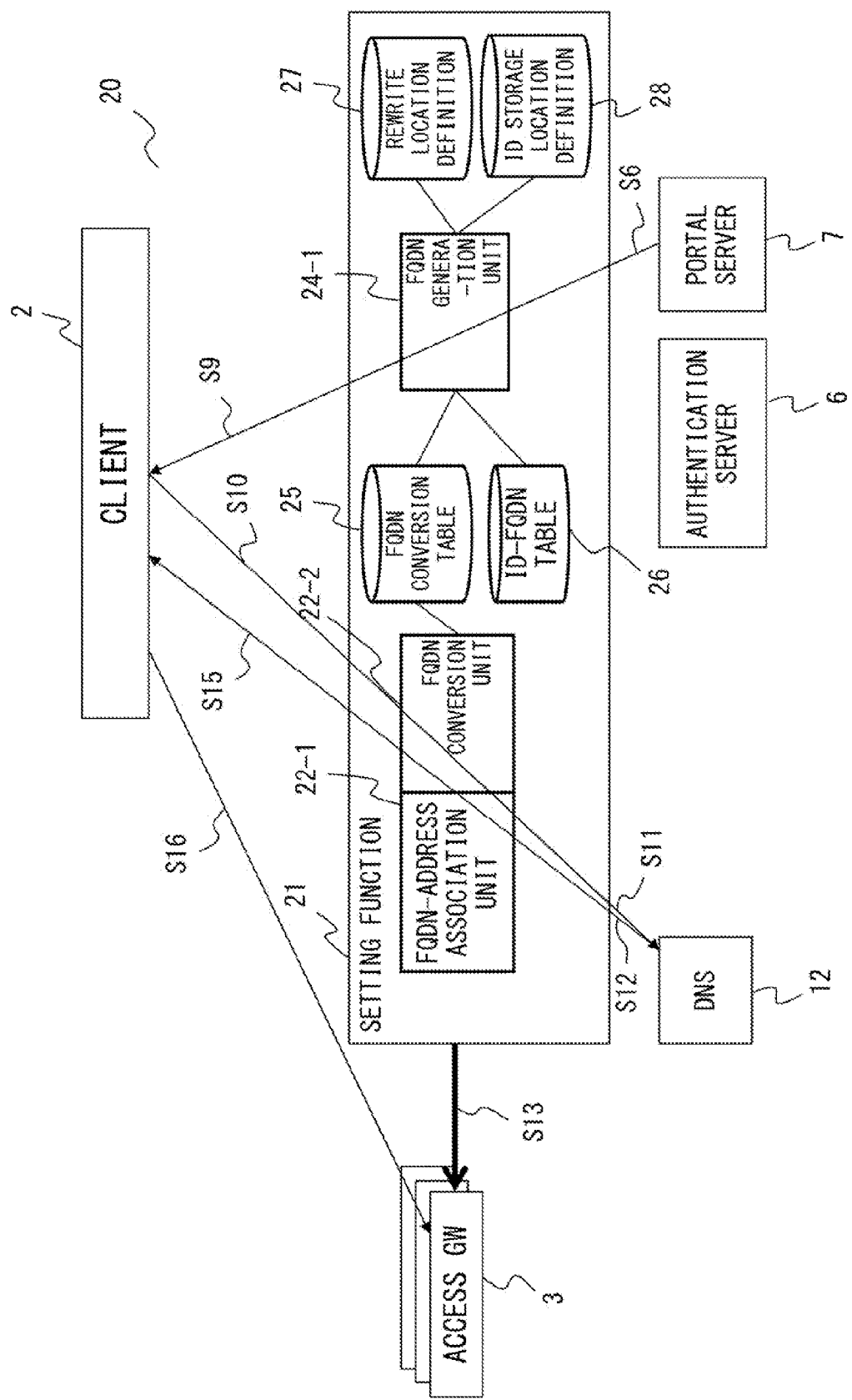
FIG. 4 is an example of the configuration of an access control system 20.

FIG. 4 is an example of the configuration of the access control system 20 according to the present embodiment. A setting function 21 includes an FQDN-address association unit 22-1, an FQDN conversion unit 22-2, an FQDN generation unit 24-1, and a storage unit (not illustrated in the attached drawings). The storage unit stores the FQDN conversion table 25, the ID-FQDN table 26, the rewrite location definition information 27, and the ID storage location definition information 28.

The FQDN generation unit 24-1 rewrites for each authenticated ID the FQDN of the contents server in the message to be transmitted by the portal server 7 to the client 2. That is, the FQDN generation unit 24-1 extracts the FQDN of the contents server from the message, and converts the extracted FQDN to any FQDN for each authenticated ID. Then, the FQDN generation unit 24-1 rewrites the original FQDN (unconverted FQDN) in the message into the converted FQDN (converted FQDN. Thus, the FQDN generation unit 24-1 can set a different value for each FQDN of the portal server 7 of which each client 2 is notified. In this case, the FQDN generation unit 24-1 stores in the FQDN conversion table 25 the information in which the "unconverted FQDN" is associated with the "converted FQDN". In addition, the FQDN generation unit 24-1 stores in the ID-FQDN table 26 the information in which the "converted FQDN" is associated with the "authenticated ID".

The FQDN-address association unit 22-1 also associates the FQDN about which each client 2 has inquired of the DNS server 12 with the IP address which is a reply from the DNS server 12, and generates the information in which the "converted FQDN" is associated with the "IP address".

Thus, the correspondence between the "converted FQDN" and the "authenticated ID" and the correspondence between the "converted FQDN" and the "IP address" are acquired. From these correspondences, the "client to which the authentication server 6 has transmitted the authenticated ID" can be associated with the "client to which the DNS server 12 has transmitted the IP address as a reply".

The FQDN about which the client 2 inquires of the DNS server 12 is a converted FQDN. Therefore, the FQDN inquired about is not registered in the DNS server 12, and the inquiry cannot be processed as is. Accordingly, the FQDN conversion unit 22-2 rewrites the FQDN in the inquiry message transmitted by the client 2 to the DNS server 12 from the converted FQDN to the unconverted FQDN using the FQDN conversion table 25.

According to the present embodiment, if the FQDN inquired about by the client 2 is the "converted FQDN", the setting function 21 knows that the client is an already authenticated client. Therefore, although the session is interrupted after an authenticated ID is issued and the message in which the FQDN is rewritten for each authenticated ID is received by a client, the client can issue an inquiry request about the FQDN to the DNS server without re-authentication.

In FIG. 4, the expression of "S"+"number" assigned to each arrow corresponds to the process described with reference to FIG. 8. The present embodiment is described below in detail.

First Embodiment

The present embodiment is described with reference to the following network configuration. That is, the portal server 7 and the authentication server 6 exist in the same system. The DNS server 12 is another system. A contents server 4 and the access GW3 for controlling access to the contents server 4 are distributed and arranged in a plurality of systems.

Figure 5:
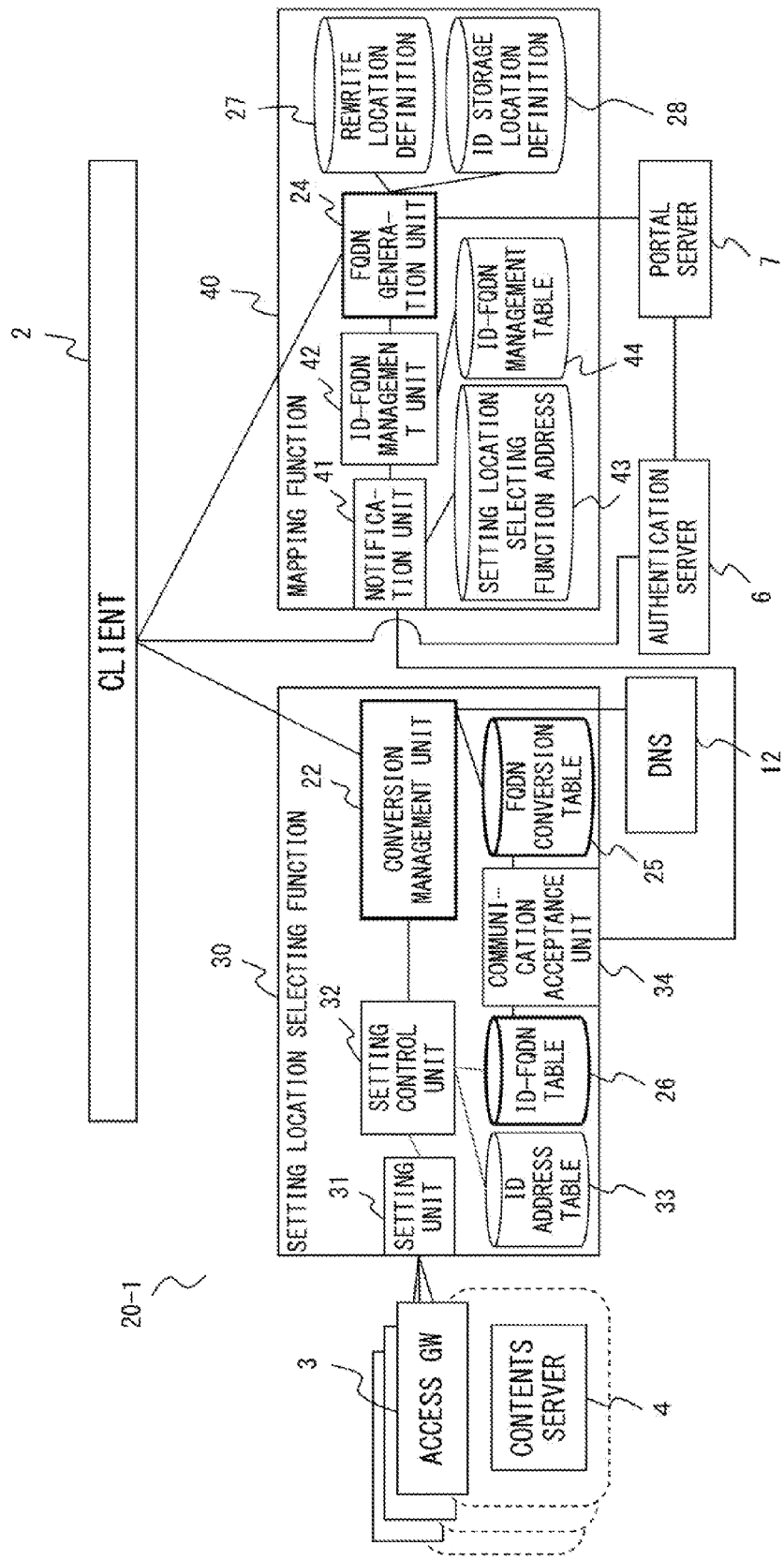
FIG. 5 is an example of the configuration of an access control system 20-1.

FIG. 5 is an example of the configuration of the access control system 20-1. In FIG. 5, the setting function 21 in FIG. 4 is divided into the ID-FQDN mapping function (hereinafter referred to as the mapping function) 40 and the setting location selecting function 30. In the case described below, each of the functions 30 and 40 is arranged in the gateway for relaying the message between the client 2 and the portal server 7 and the gateway for relaying the message between the client and the DNS server.

The client 2 is a common information processing device for transmitting a request to the portal server 7, the DNS server 12, and the contents server 4.

The contents server 4 is set as a virtual unit by the access GW3. Therefore, the IP address of the request message to the contents server 4 transmitted by the client 2 refers to the access GW3.

The portal server 7 is a common portal server which receives a request message from the application program of the client 2, and returns the data (an HTML document in this example) indicating a list of contents as a response message.

The portal server 7 also has the function of confirming an authenticated ID. That is, the portal server 7 checks whether or not an authenticated ID is stored in the request message. When an authenticated ID is stored in the request message, the portal server 7 inquires of the authentication server 6 about the authenticated ID to confirm the correctness of the authenticated ID. When the request message does not store the authenticated ID, or when the authenticated ID is not correct due to the expiry etc., the portal server 7 transmits a response message instructing the client 2 to issue a redirection to the authentication server 6.

The authentication server 6 is a common server which accepts the authentication request from the client 2, and performs an authenticating process. When the authenticating process is normally completed, the authentication server 6 transmits an authenticated ID to the client 2.

The DNS server 12 receives an inquiry message about an FQDN from the client 2, and returns an IP address corresponding to the inquired FQDN. If the inquired FQDN is the FQDN of the contents server 4, the DNS server 12 selects an appropriate contents server 4 depending on the source IP address of the inquiry message or the load state of the contents server. Then, the DNS server 12 returns as a reply the IP address of the access GW3 which defines the selected contents server 4 as a virtual server.

The access GW3 accepts a setting message for setting an authenticated ID from the setting location selecting function 30, and holds a list of correct authenticated IDs. The access GW3 receives a request message from the client 2 to the contents server 4, and checks the authenticated ID in the request message. If the authenticated ID stored in the request message exists in the list of correct authenticated IDs, then the access GW3 transfers the request message to the contents server 4. If the authenticated ID is not stored in the request message, or the stored authenticated ID is not in the list of correct authenticated IDs, the access GW3 interrupts the request.

The contents server 4 is a common contents server which receives the request message from the client 2, and provides contents for the client 2.

The mapping function 40 is a program activated in the gateway device of the portal server 7 in the present embodiment. The program for performing the mapping function 40 can also be activated in the portal server 7. The mapping function 40 includes an FQDN generation unit 24, a notification unit 41, an ID-FQDN management unit 42, and a storage unit (not illustrated in the attached drawings). The storage unit stores the rewrite location definition information 27, the ID storage location definition information 28, setting location selecting function address information 43, and the ID-FQDN management table 44. The FQDN generation unit 24 corresponds to the FQDN generation unit 24-1 in FIG. 4.

The FQDN generation unit 24 extracts the FQDN of the contents server 4 in the HTML document to be transmitted to the client 2 by the portal server 7, and converts the extracted FQDN to any FQDN for each authenticated ID. Then, the FQDN generation unit 24 rewrites the original FQDN (unconverted FQDN) in the HTML document into the converted FQDN (converted FQDN). In this case, the FQDN generation unit 24 acquires from the rewrite location definition information 27 the location in which the FQDN of the portal server 7 in the HTML document is set. In addition, the FQDN generation unit 24 acquires from the ID storage location definition information 28 the location in which the authenticated ID is set in the message.

The ID-FQDN management unit 42 manages the correspondence information among an authenticated ID, an unconverted FQDN, and a converted FQDN using the ID-FQDN management table 44.

The notification unit 41 notifies the address of the setting location selecting function 30 of the authenticated ID, the unconverted FQDN, and the converted FQDN using the setting location selecting function address information 43.

The setting location selecting function 30 is a program activated in the gateway device of the DNS server 12 in the present embodiment. The program for executing the setting location selecting function 30 can also be activated in the DNS server 12. The setting location selecting function 30 includes a setting unit 31, a setting control unit 32, a conversion management unit 22, a communication acceptance unit 34, and a storage unit (not illustrated in the attached drawings). The storage unit stores the ID address table 33, the ID-FQDN table 26, and the FQDN conversion table 25. The conversion management unit 22 corresponds to a combination of the FQDN conversion unit 22-2 and the FQDN-address association unit 22-1 in FIG. 4.

The communication acceptance unit 34 accepts a notification message from the mapping function 40. The notification message includes a set of an authenticated ID, an unconverted FQDN, and a converted FQDN. After receiving the notification message, the communication acceptance unit 34 stores a set of the authenticated ID and the converted FQDN in the ID-FQDN table 26. The communication acceptance unit 34 also stores a set of the unconverted FQDN and the converted FQDN in the FQDN conversion table 25.

The conversion management unit 22 rewrites the FQDN in the message received and transmitted between the client 2 and the DNS server 12. The conversion management unit 22 acquires the FQDN to be rewritten from the FQDN conversion table 25.

When the FQDN in the inquiry message transmitted from the client 2 to the DNS server 12 is a converted FQDN, the conversion management unit 22 rewrites the converted FQDN in the message into the unconverted FQDN. Then, the conversion management unit 22 transfers the rewritten message to the DNS server 12.

When a reply message is received from the DNS server in response to the message after rewriting into the unconverted FQDN, the conversion management unit 22 rewrites the unconverted FQDN in the reply message into the converted FQDN. The conversion management unit 22 transfers to the client 2 the reply message from the DNS server 12 which has rewritten the FQDN into the converted FQDN.

The conversion management unit 22 associates the converted FQDN with the IP address contained in the reply message, and notifies the setting control unit 32 of the correspondence information between the FQDN and the IP address.

The setting control unit 32 associates the authenticated ID with the IP address based on the correspondence between the authenticated ID of the ID-FQDN table 26 and the converted FQDN, and the correspondence between the FQDN acquired by the conversion management unit 22 and the IP address. The setting control unit 32 notifies the setting unit 31 of the associated authenticated ID and IP address.

Then, the setting control unit 32 stores the correspondence between the authenticated ID and the IP address in the ID address table 33. If a reply message is received from the DNS server 12 in response to the inquiry from the client 2, it is assumed that the set of the acquired authenticated ID and IP address has already existed in the ID address table 33. In this case, the setting control unit 32 does not notify the setting unit 31 of the set of the authenticated ID and IP address.

The setting unit 31 transmits to the access GW3 specified by the IP address the setting message for setting the authenticated ID in the access GW3 according to the notification from the setting control unit 32.

Figure 6:
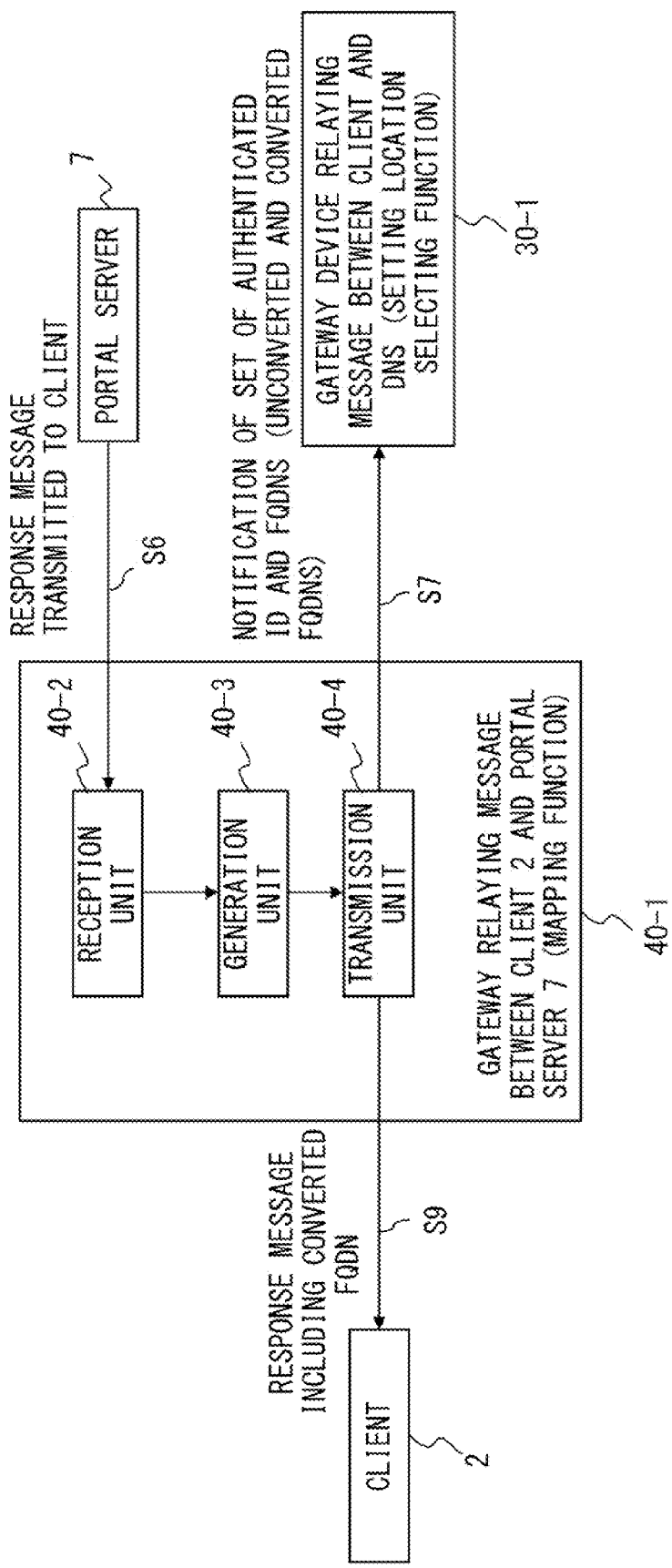
FIG. 6 is the configuration of a gateway device 40-1 including a mapping function 40.

FIG. 6 is the configuration of the gateway device 40-1 including the mapping function 40 according to the present embodiment. The gateway device 40-1 is a device for relaying a message between, for example, the client 2 and the portal server 7. The gateway device 40-1 includes a reception unit 40-2, a generation unit 40-3, and a transmission unit 40-4.

The reception unit 40-2 receives a message for providing resources such as a list of contents etc. from the portal server 7 to the client 2. The generation unit 40-3 generates an FQDN (converted FQDN) from which the FQDN (unconverted FQDN) can be designated for each authenticated ID based on the FQDN and the authenticated ID in the message for providing the resources. The generation unit 40-3 rewrites the unconverted FQDN in the message into a converted FQDN. The process by the reception unit 40-2 and the generation unit 40-3 correspond to the processes in s6 and s7 in FIG. 8.

The transmission unit 40-4 notifies of the correspondence among the authenticated ID, the unconverted FQDN, and the converted FQDN the gateway device 30-1 including the setting location selecting function 30 and relaying the message between a client and a DNS server. The notifying process corresponds to the process in S7 in FIG. 8.

The transmission unit 40-4 transfers to the client 2 a message for providing the resources in which the FQDN has been rewritten by the generation unit 40-3. The transferring process corresponds to the process in S9 in FIG. 8.

Figure 7:
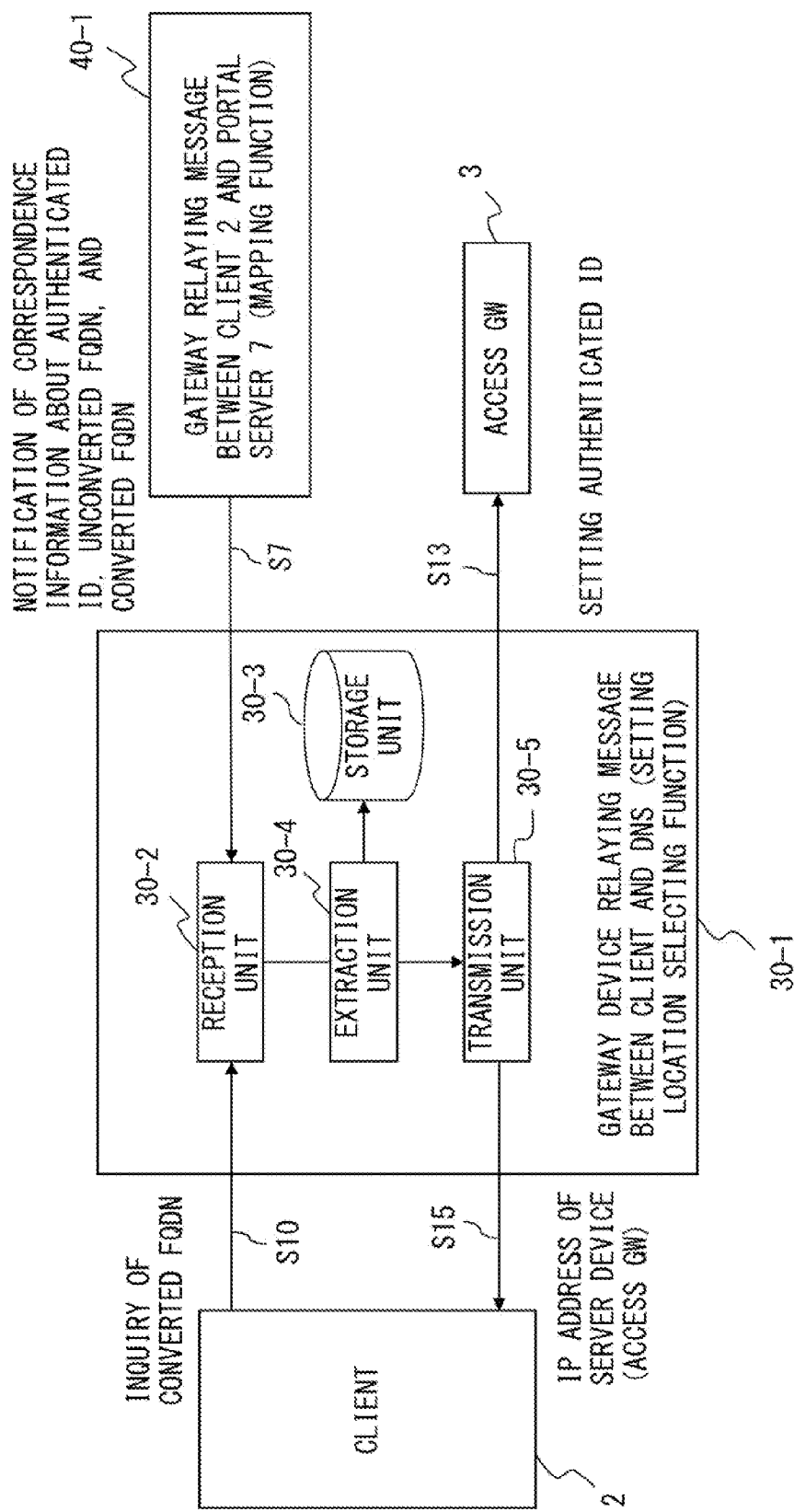
FIG. 7 is the configuration of a gateway device 30-1 including a setting location selecting function 30.

FIG. 7 is the configuration of the gateway device 30-1 including the setting location selecting function 30 according to the present embodiment. The gateway device 30-1 is, for example, a device for relaying a message between a client and a DNS server. The gateway device 30-1 includes a reception unit 30-2, a storage unit 30-3, an extraction unit 30-4, and a transmission unit 30-5.

The reception unit 30-2 receives the correspondence information among the authenticated ID, the unconverted FQDN, and the converted FQDN notified from the transmission unit 40-4 of the gateway device 30-1 including the mapping function 40. The reception unit 30-2 stores in the storage unit 30-3 the received correspondence information between the authenticated ID, the unconverted FQDN, and the converted FQDN. The receiving process corresponds to the process in S7 in FIG. 8.

The reception unit 30-2 also performs the following process. For example, a user selects the contents to be viewed from a list of contents in the client 2 which has received the message for providing resources. Then, to solve the name of the contents server 4, the client 2 transmits an inquiry message about the FQDN (converted FQDN) set in the message for providing the resources to the DNS server 12. The reception unit 30-2 receives the inquiry message about the converted FQDN from the client 2. The receiving process corresponds to the process in S10 in FIG. 8.

The extraction unit 30-4 extracts from the storage unit 30-3 the authenticated ID and the unconverted FQDN corresponding to the converted FQDN in the inquiry message received from the client 2.

Then, when the FQDN in the inquiry message from the client 2 is the converted FQDN in the gateway device 30-1, the converted FQDN in the message is rewritten to the unconverted FQDN.

Next, the gateway device 30-1 inquires of the DNS server 12 to acquire the IP address of the unconverted FQDN. The gateway device 30-1 can also functions as the DNS server 12. The gateway device 30-1 associates the authenticated ID with the IP address.

The transmission unit 30-5 transmits a setting message for setting an authenticated ID in the access GW3 to the IP address (that is, the access GW3) associated with the authenticated ID. The transmitting process corresponds to the process in S13 in FIG. 8.

The FQDN of the reply message from the DNS server 12 in response to the inquiry message is rewritten from the unconverted FQDN to the converted FQDN. The transmission unit 30-5 transfers to the client 2 the reply message from the DNS server 12 in which the FQDN is converted into the converted FQDN. The processes correspond to the process in S11 through S13, and S15 in FIG. 8.

The contents described with reference to FIGS. 5 through 7 are described in detail with reference to FIG. 8.

Figure 8:
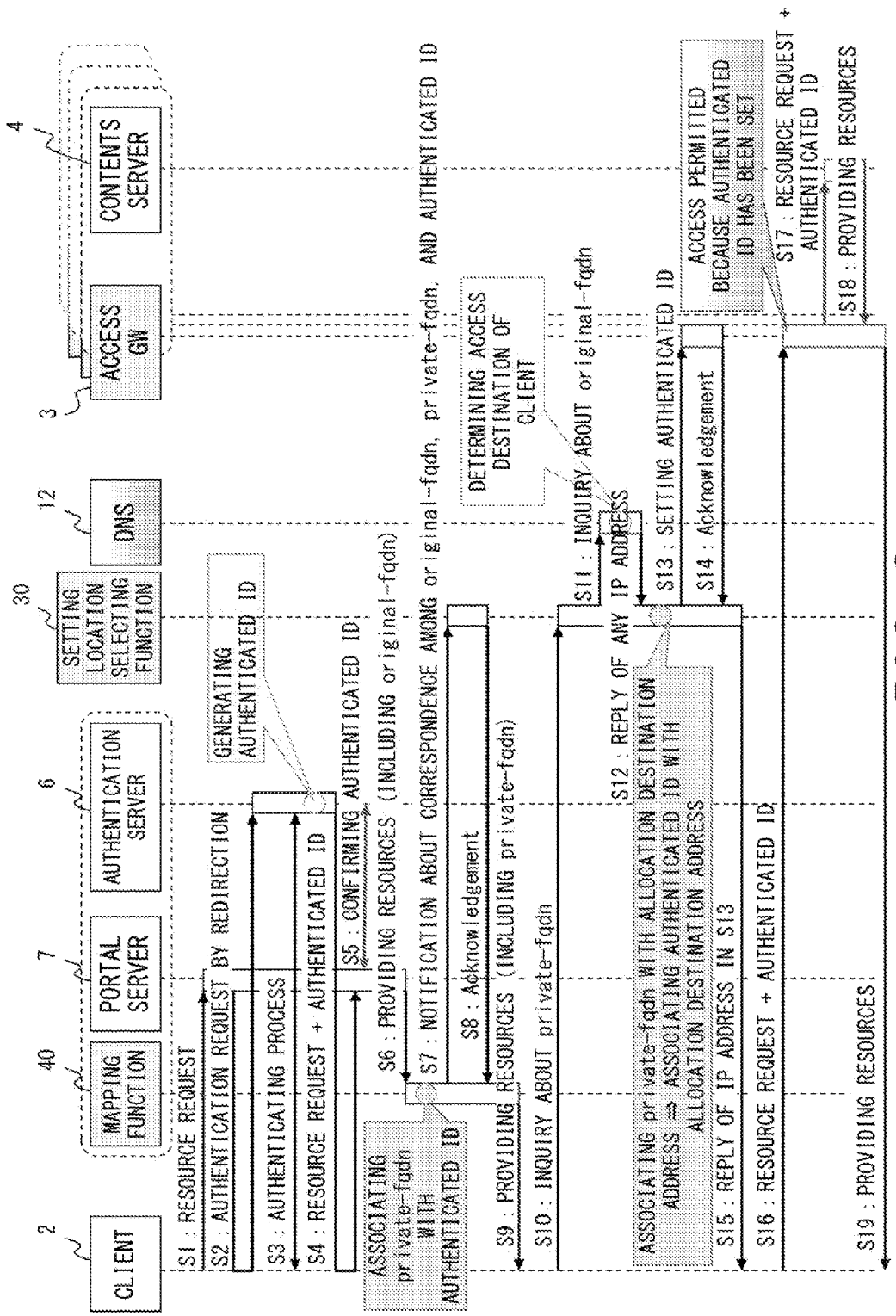
FIG. 8 is an example of the entire sequence of the access control system 20-1.

FIG. 8 is an example of the entire sequence of the access control system 20-1 according to the present embodiment. The client 2 transmits a resource (a list of contents etc.) request message to the portal server 7 (S1).

Since the first resource request message stores no authenticated ID, the portal server 7 transmits a response specifying a redirection to the client 2 (instructs the client 2 to access the authentication server). Upon receipt of the response specifying the redirection, the client 2 transmits a request to the authentication server 6 (S2).

The client 2 performs an authenticating process by, for example, transmitting an ID, a password, etc. to the authentication server 6. When the authenticating process is completed, the authentication server 6 generates an authenticated ID (S3).

The authentication server 6 notifies the client 2 of the authenticated ID, and transmits to the client 2 a response message specifying a redirection to the portal server 7. Upon receipt of the response message, the client 2 transmits a response message storing the authenticated ID to the portal server 7 (S4).

When the portal server 7 receives the request message storing the authenticated ID, it confirms with the authentication server 6 the correctness of the authenticated ID (S5).

When the authenticated ID is correct, the portal server 7 provide the mapping function 40 with the resources such as a list of contents etc to provide the client 2 with the resources. (S6).

Upon receipt of a message for providing resources such as a list of contents from the portal server 7 to the client 2, the mapping function 40 rewrites the FQDN of the portal server 7 in the message. That is, the mapping function 40 generates a FQDN (converted FQDN) for designation of the FQDN (unconverted FQDN) for each authenticated ID based on the FQDN of the portal server 7 and the authenticated ID in the message for providing the resources. The mapping function 40 rewrites the unconverted FQDN in the message into the converted FQDN. Afterwards, the unconverted FQDN is referred to as "original-fqdn", and the converted FQDN is referred to as "private-fqdn".

The mapping function 40 notifies the setting location selecting function 30 of the correspondence among the original-fqdn, the private-fqdn, and the authenticated ID in the message (S7).

Then, the setting location selecting function 30 returns an acknowledgement to the mapping function 40 (S8).

The mapping function 40 transfers to the client 2 the message for providing the resources from the portal server 7 which has performed the process of rewriting into the converted FQDN (private-fqdn) in S6 (S9).

In the client 2 which has received the message for providing the resources, a user selects contents to be viewed from the list of the contents. Then, to solve the name of the contents server 4, the client 2 transmits an inquiry message about the private-fqdn to the DNS server 12 (S10).

The setting location selecting function 30 rewrites the private-fqdn in the inquiry message about the FQDN from the client 2 to the original-fqdn according to the correspondence information between the original-fqdn and the private-fqdn notified in S7. Then, the setting location selecting function 30 transfers the rewritten inquiry message to the DNS server 12 (S11).

The DNS server 12 selects an appropriate content server 4 based on the source IP address of the client 2 and the load state of the contents server 4, and determines the IP address to be transmitted as a reply to the client 2. The DNS server 12 transmits the determined IP address as a reply message in response to the inquiry from the client 2 (S12). Since the contents server 4 is set as a virtual unit by the access GW3, the determined IP address is the IP address of the access GW3.

The setting location selecting function 30 rewrites the original-fqdn in the reply message from the DNS server 12 to the private-fqdn. The setting location selecting function 30 associates the private-fqdn with the IP address in the reply message and stores them. The setting location selecting function 30 associates the authenticated ID with the IP address and stores them based on the correspondence between the private-fqdn and the IP address in the reply message, and the correspondence between the notified private-FQDN notified in S7 and the authenticated ID. Then, the setting location selecting function 30 transmits the setting message for setting the authenticated ID in the access GW3 to the IP address associated with the authenticated ID (that is, the access GW3) (S13).

When the authenticated ID is set completely, the access GW3 which has received the setting message returns an acknowledgement to the setting location selecting function 30 (S14).

The setting location selecting function 30 transfers to the client 2 the reply message in which the original-fqdn is rewritten to the private-fqdn to the client 2 is S13 (S15).

The client 2 defines as a destination IP address the IP address received from the DNS server 12 as a reply to the inquiry about the private-fqdn, and transmits a resource request message of the contents to the destination IP address (S16). In this case, the authenticated ID is stored in the resource request message.

When the access GW3 receives a resource request message of the contents from the client 2, it checks whether or not the authenticated ID in the request message exists in the list of set authenticated IDs to confirm the correctness of the authenticated ID. If the authenticated ID is correct, the access GW3 transfers the resource request message to the contents server 4 (S17).

The contents server 4 returns the response message to the resource request message to the access GW3 (S18).

The access GW3 transfers to the client 2 the response message to the resource request message from the contents server 4 (S19).

Described above is the entire sequence of the present embodiment. The mapping function 40 and the setting location selecting function 30 are mainly described below. First, the detailed operation of the mapping function 40 is described. FIG. 9 is the flowchart corresponding to the processes in S6 through S9 of the mapping function 40.

FIG. 9 is a flowchart of the process of the mapping function 40 when a response message for providing resources such as a list of contents is received according to the present embodiment.

Figure 10:
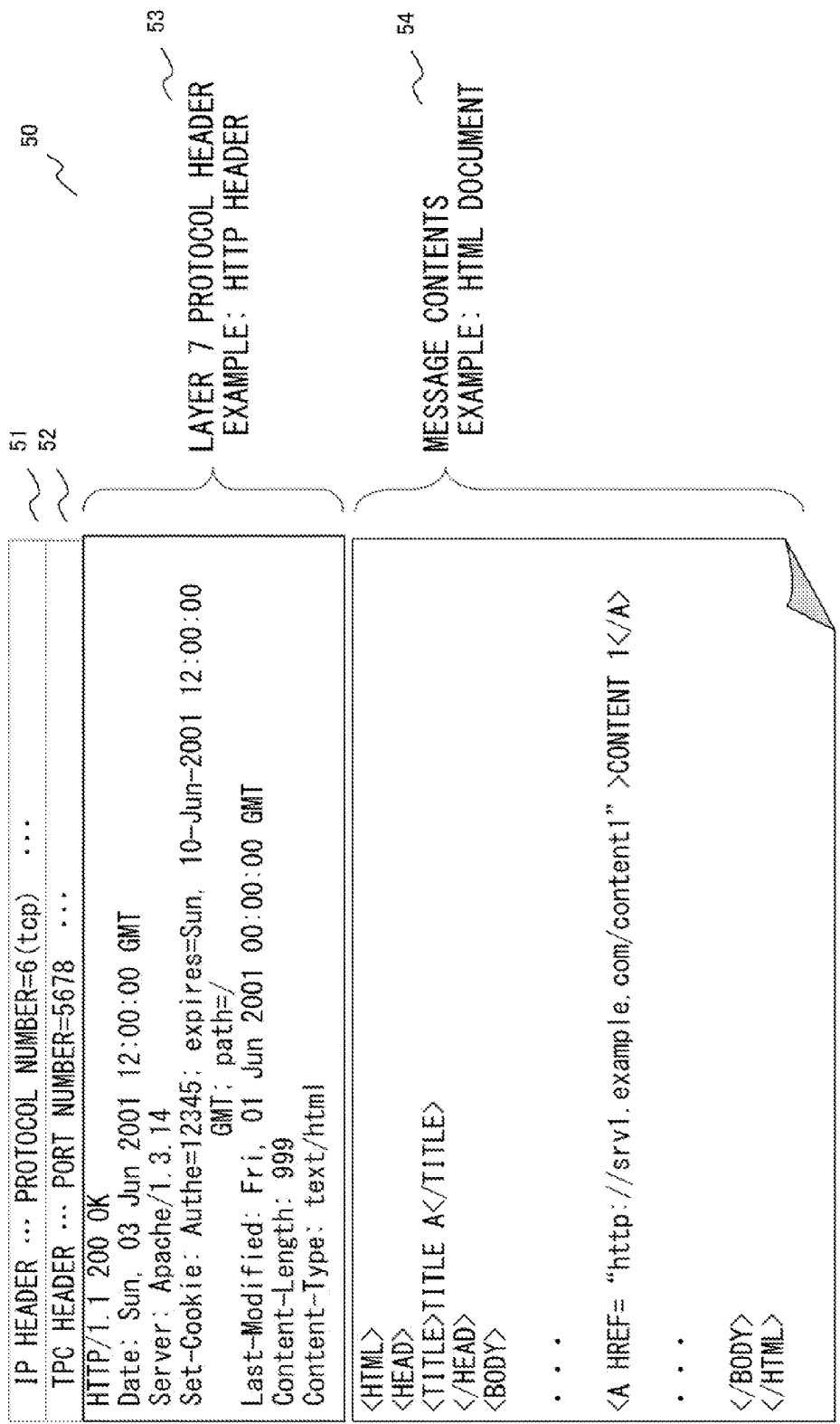
FIG. 10 is an example of a response message 50 for providing resources transmitted from a portal server 7 to a client 2.

The FQDN generation unit 24 receives a response message for providing resources such as a list of contents etc. from the portal server 7 to the client 2 (S21). FIG. 10 is an example of the response message 50 for providing resources transmitted from the portal server 7 to the client 2.

In FIG. 10, the response message 50 for providing resources such as a list of contents etc. includes an IP header 51, a TPC header 52, a layer 7 protocol header (for example, an HTTP header) 53, a message content (for example, an HTML document), etc.

The FQDN generation unit 24 extracts from the response message 50 an authenticated ID and the FQDN of the contents server 4 (S22). The FQDN generation unit 24 acquires the attribute information designating the extraction location of the authenticated ID in the response message 50 from the ID storage location definition information 28. In addition, the FQDN generation unit 24 acquires from the rewrite location definition information 27 the attribute information designating the extraction location of the FQDN of the contents server 4 in the response message 50. FIG. 11 is an example of the ID storage location definition information 28.

The ID storage location definition information 28 illustrated in FIG. 11 defines the cookie specified by the header field name "Set-Cookie" of the HTTP including the NAME of "Authe" as an authenticated ID. Therefore, the FQDN generation unit 24 which has received the response message 50 extracts the character string "12345" from "Set-Cookie:Authe=12345;" of the HTTP header 53 as an authenticated ID.

Next, FIG. 12 is an example of the rewrite location definition information 27. The rewrite location definition information 27 in FIG. 12 defines the attribute of HREF of the element A in the HTML document as a rewrite location. Therefore, the FQDN generation unit 24 extracts a character string "srv1.example.com" from <A HREF="Http://srv1.example.com/content1"> of an HTML document 54 according to the rewrite location definition information 27. The character string "srv1.example.com" is extracted as the FQDN of the contents server 4.

The FQDN generation unit 24 passes the extracted authenticated ID and the extracted FQDN of the contents server to the ID-FQDN management unit 42.

The ID-FQDN management unit 42 searches the ID-FQDN management table 44 using the authenticated ID and the unconverted FQDN as keys (S23). FIG. 13 is an example of the ID-FQDN management table 44.

In FIG. 13, the ID-FQDN management table 44 includes as an entry a set of an "authenticated ID" and an "unconverted FQDN" and a "converted FQDN" corresponding to the authenticated ID.

If there is no corresponding entry as a result of the search in S23 (NO in S23), then the ID-FQDN management unit 42 generates any FQDN (converted FQDN) corresponding to the combination of an authenticated ID and the FQDN of the contents server 4. For example, the ID-FQDN management unit 42 generates the FQDN "ccc.example.com" corresponding to the combination of the authenticated ID "12345" and the FQDN "srv1.example.com" of the contents server 4 as a converted FQDN. Then, the ID-FQDN management unit 42 associates the generated converted FQDN with the unconverted FQDN and the authenticated ID, and enters them in the ID-FQDN management table 44 (S24).

The ID-FQDN management unit 42 passes to the notification unit 41 the set of the authenticated ID "12345", the FQDN "srv1.example.com" of the contents server, and the converted FQDN "ccc.example.com".

The notification unit 41 refers to the setting location selecting function address information 43. FIG. 14 is an example of a setting location selecting function address. In FIG. 14, the setting location selecting function address information 43 stores, for example, "192.0.2.111" as a setting location selecting function address.

FIG. 41 transmits to the setting location selecting function 30 a notification message including the set of the authenticated ID, the unconverted FQDN and the converted FQDN of the contents server 4 using the IP address "192.0.2.111" obtained from the setting location selecting function address information 43 as a destination (S25). FIG. 15 is an example of a notification message transmitted from the mapping function to the setting location selecting function.

In FIG. 15, the notification message 60 includes the set of the authenticated ID "12345", the unconverted FQDN "srv1.example.com", and the converted FQDN "ccc.example.com" of the contents server 4.

Upon receipt of an acknowledgement from the setting location selecting function 30 in response to the notification message 60, the notification unit 41 completes the notifying process in S25. Then, the notification unit 41 notifies the ID-FQDN management unit 42 of the completion of the transmitting process of the notification message 60.

If a corresponding entry exists as a result of the search in S23 (YES in S23), or if the notifying process of the notification message 60 is completed in S25, then the ID-FQDN management unit 42 performs the following process. That is, the ID-FQDN management unit 42 passes to the FQDN generation unit 24 the unconverted FQDN "srv1.example.com" and the converted FQDN "ccc.example.com" of the portal server 7.

The FQDN generation unit 24 rewrites the FQDN "srv1.example.com" of the contents server 4 in the HTML document 54 extracted in S22 into the converted FQDN "ccc.example.com" (S26).

The FQDN generation unit 24 transmits to the client 2 the response message 50 including the rewritten HTML document (S27).

Next, the more detailed operations of the setting location selecting function 30 are described below. The operations of the setting location selecting function 30 are divided into two cases, that is, the case in which the notification message 60 from the mapping function 40 is received (S7 and S8), and the case in which an inquiry message from the client 2 to the DNS server 12 is received (S10 through S15). First, FIG. 16 is a detailed flowchart of the operation (S7 and S8) of the setting location selecting function 30 when the notification message 60 is received from the mapping function 40.

The communication acceptance unit 34 receives the notification message 60 from the mapping function 40 (S31). As illustrated in FIG. 15, the notification message 60 includes an authenticated ID, an unconverted FQDN, and a converted FQDN.

The communication acceptance unit 34 enters the set of the authenticated ID and the converted FQDN in the ID-FQDN table 26 (S32). The communication acceptance unit 34 enters the set of the unconverted FQDN and the converted FQDN in the FQDN conversion table 25. FIG. 17 is an example of the ID-FQDN table 26. FIG. 18 is an example of the FQDN conversion table 25.

When the entry of the FQDN conversion table 25 and the ID-FQDN table 26 is completed, the communication acceptance unit 34 returns an acknowledgement to the mapping function 40 (S33).

Figure 19:
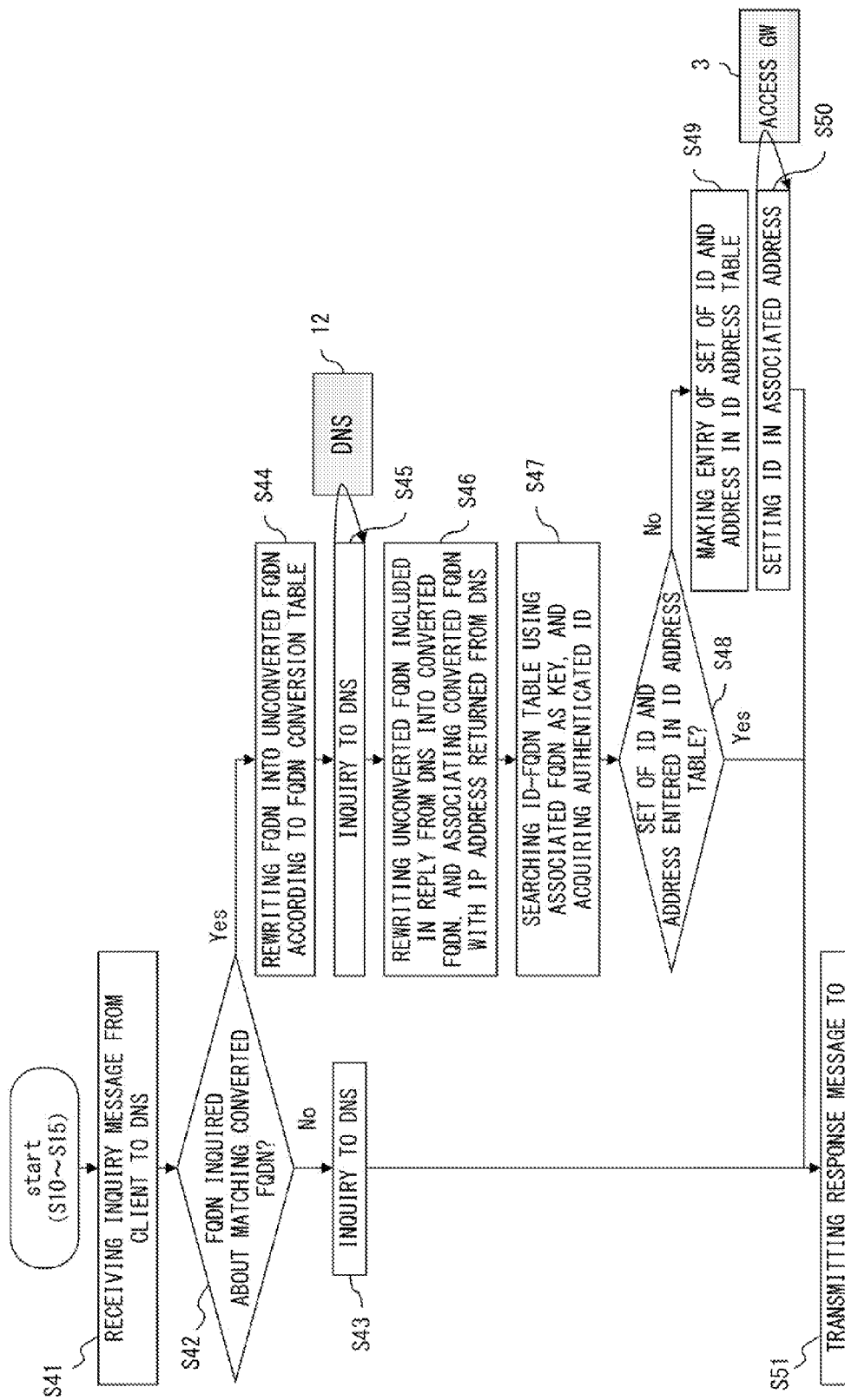
FIG. 19 is a detailed flowchart of the operation (S10 through S15) of the setting location selecting function 30 when an inquiry message about the FQDN is received from the client 2 to a DNS server 12.

FIG. 19 is a detailed flowchart of the operation (S10 through S15) of the setting location selecting function 30 when an inquiry message about the FQDN is received from the client 2 to a DNS server 12.

First, the conversion management unit 22 receives an inquiry message from the client 2 to the DNS server 12 (S41). As described in the process in S10 in FIG. 8, the FQDN inquired about in the inquiry message is the converted FQDN (private-fqdn).

The conversion management unit 22 retrieves the column "converted FQDN" of the FQDN conversion table 25 using the FQDN inquired about (S42). In S42, if no entry is hit in the FQDN conversion table 25 (NO in S421), the inquiry has been issued to the DNS server 12 from a client other than the client who has received the converted FQDN. In this case, the conversion management unit 22 transfers an inquiry message to the DNS server 12 (S43), and control is passed to S51 when a reply message is received from the DNS server 12.

Described below is the case in which there is a entry hit in the FQDN conversion table 25 in S42, and an unconverted FQDN can be acquired (YES in S42). In this case, the conversion management unit 22 finds that the inquiry has been issued from the client 2 who has received the converted FQDN to the DNS server 12.

In this case, the conversion management unit 22 rewrites the FQDN (converted FQDN) of the inquiry message into the unconverted FQDN acquired by searching the FQDN conversion table 25 in S42 (S44). For example, if the contents of the FQDN conversion table 25 are as described in FIG. 18, and the FQDN inquired about is "ccc.example.com", then the conversion management unit 22 rewrites the FQDN into "srv-1.example.com".

The conversion management unit 22 transmits the inquiry message to the DNS server 12, and acquires a reply message from the DNS server 12 (S45).

The conversion management unit 22 rewrites the unconverted FQDN in the reply message into the converted FQDN (S46). For example, the conversion management unit 22 rewrites "srv1.example.com" in the reply message into "ccc.example.com".

In addition, the conversion management unit 22 associates the converted FQDN with the IP address included in the reply message from the DNS server 12. Then, the conversion management unit 22 passes the set of the associated converted FQDN and IP address to the setting control unit 32. For example, if the IP address included in the reply is "192.0.2.222", the conversion management unit 22 passes the set of "ccc.example.com" and "192.0.2.222" to the setting control unit 32.

The setting control unit 32 searches the ID-FQDN table using the converted FQDN as a key, and acquires an authenticated ID (S47). Therefore, the setting control unit 32 can associate the authenticated ID with the IP address. For example, when the ID-FQDN table 26 corresponds to FIG. 17, the setting control unit 32 performs the search using the converted FQDN "ccc.example.com" as a key, and acquires the authenticated ID "12345". In this case, the associated authenticated ID and IP address are "12345" and "192.0.2.222".

The setting control unit 32 searches the ID address table 33 using the set of the authenticated ID and the IP address as a key (S48). FIG. 20 is an example of the ID address table 33. In FIG. 20, the ID address table 33 includes the authenticated ID and the IP address.

If the set of the authenticated ID and the IP address has already been entered in the ID address table 33 as a result of the search in S48 (YES in S48), then the setting control unit 32 passes control to the conversion management unit 22, and then to S51. If the set of the authenticated ID and the IP address has not been entered in the ID address table 33 as a result of the search in S48 (NO in S48), then control is passed to S49. For example, if the set of the authenticated ID "12345" and the IP address "192.0.2.222" is retrieved in FIG. 20, then it is found that the set has not been entered in the ID address table 33, thereby passing control to S49.

The setting control unit 32 enters the set of the authenticated ID and the IP address in the ID address table 33 (S49), and passes set of the authenticated ID and the IP address to the setting unit 31.

The setting unit 31 transmits to the IP address received from the setting control unit 32 a setting message of the authenticated ID received from the setting control unit 32 (S50). The IP address refers to one of the distributed and arranged access GW3. FIG. 21 is an example of the setting message 61 transmitted from the setting location selecting function 30 to the access GW3. In FIG. 21, the authenticated ID "12345" is set in the setting message 61.

Upon receipt of the setting message 61, the access GW3 sets the authenticated ID. Upon completion of setting the authenticated ID, the access GW3 returns an acknowledgement to the setting location selecting function 30.

Upon receipt of the acknowledgement from the setting location selecting function 30, the setting unit 31 notifies the setting control unit 32 of the completion of setting the authenticated ID. Then, the setting control unit 32 passes control to the conversion management unit 22.

The conversion management unit 22 transfers the reply message from the DNS server 12 to the client 2 (S51).

According to the present embodiment, the following process can be performed even when there is an HTTP proxy server or a DNS cache server between a successfully and an authentication server or between a client and a DNS server. That is, the "client to which the authentication server has transmitted an authenticated ID" can be associated with the "client to which the DNS server has returned an IP address". Therefore, the setting location of the authenticated ID can be the access GW which each client constantly accesses. Accordingly, the frequency of setting the authenticated ID is independent of the number of access GWs, and the performance of the entire system can be improved depending on the number of distributed contents servers and the access GWs.

If the FQDN inquired about by the client 2 is "converted FQDN", the setting function 21 finds that the client has already been authenticated. Therefore, assume that an authenticated ID is issued, a client receives from the portal server 7 a message in which the FQDN has been rewritten for each authenticated ID, and then the session is disconnected. In this case, the client can issue an inquiry request for the FQDN to the DNS server without receiving re-authentication. That is, although the sequence is started from S10 after the session is disconnected between S9 and S10 in FIG. 8, it can be confirmed that the client has already been authenticated if the FQDN inquired by the client is the "converted FQDN".

Second Embodiment

Described in the present embodiment is an example of setting the expiration date in each entry of the ID-FQDN management table of the mapping function, the ID-FQDN table, the FQDN conversion table, and the ID address table of the setting location selecting function according to the expiration date of the authenticated ID. In the present embodiment, the same component as in the first embodiment is assigned the same reference numeral, and the description is omitted here.

Figure 22:
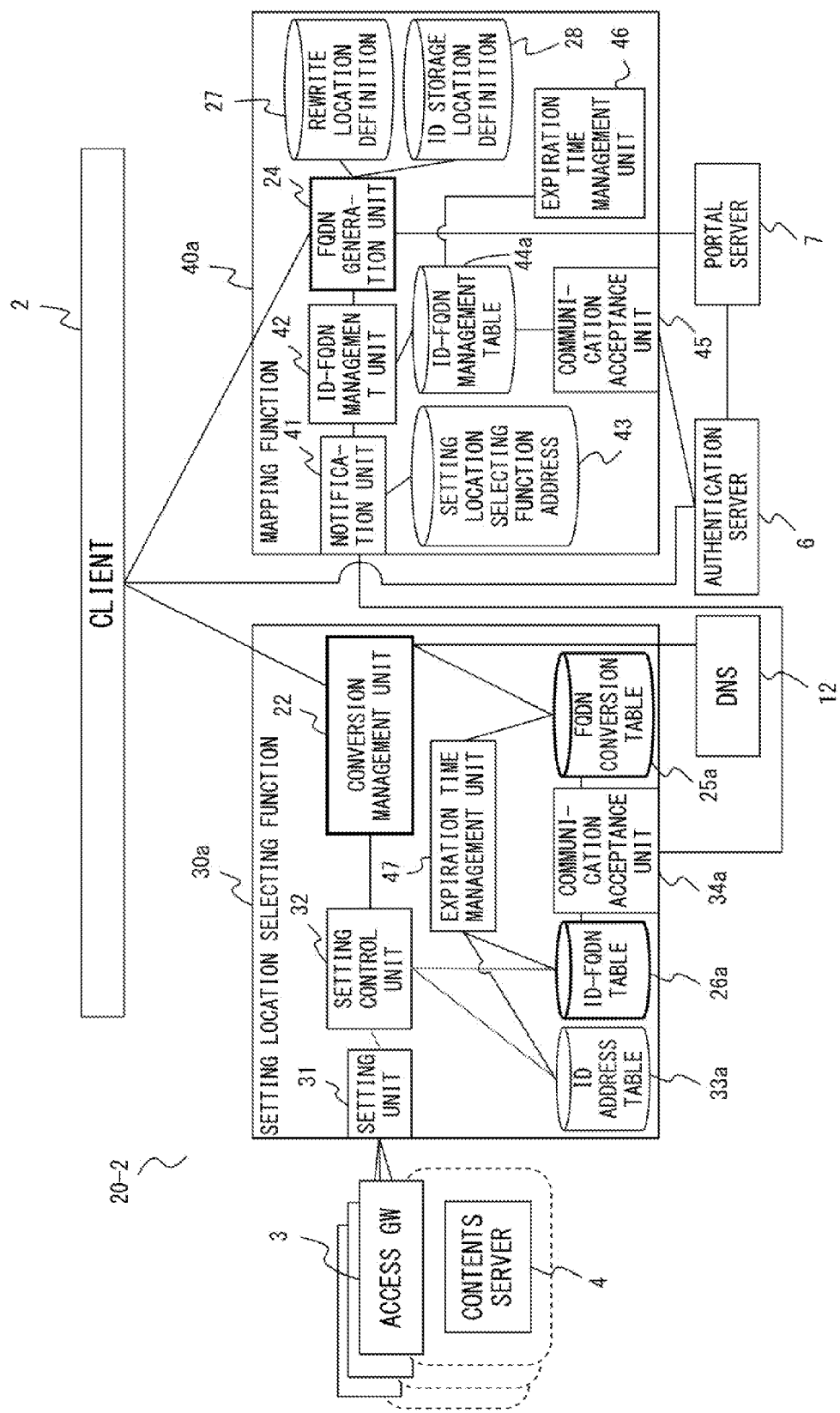
FIG. 22 is an example of the configuration of an access control system 20-2.

FIG. 22 is an example of the configuration of the access control system 20-2 in the present embodiment. In the access control system 20-2, the mapping function 40a is obtained by adding a notification acceptance unit 45 and an expiration date management unit 46 to the mapping function 40 in FIG. 5.

Figure 23:
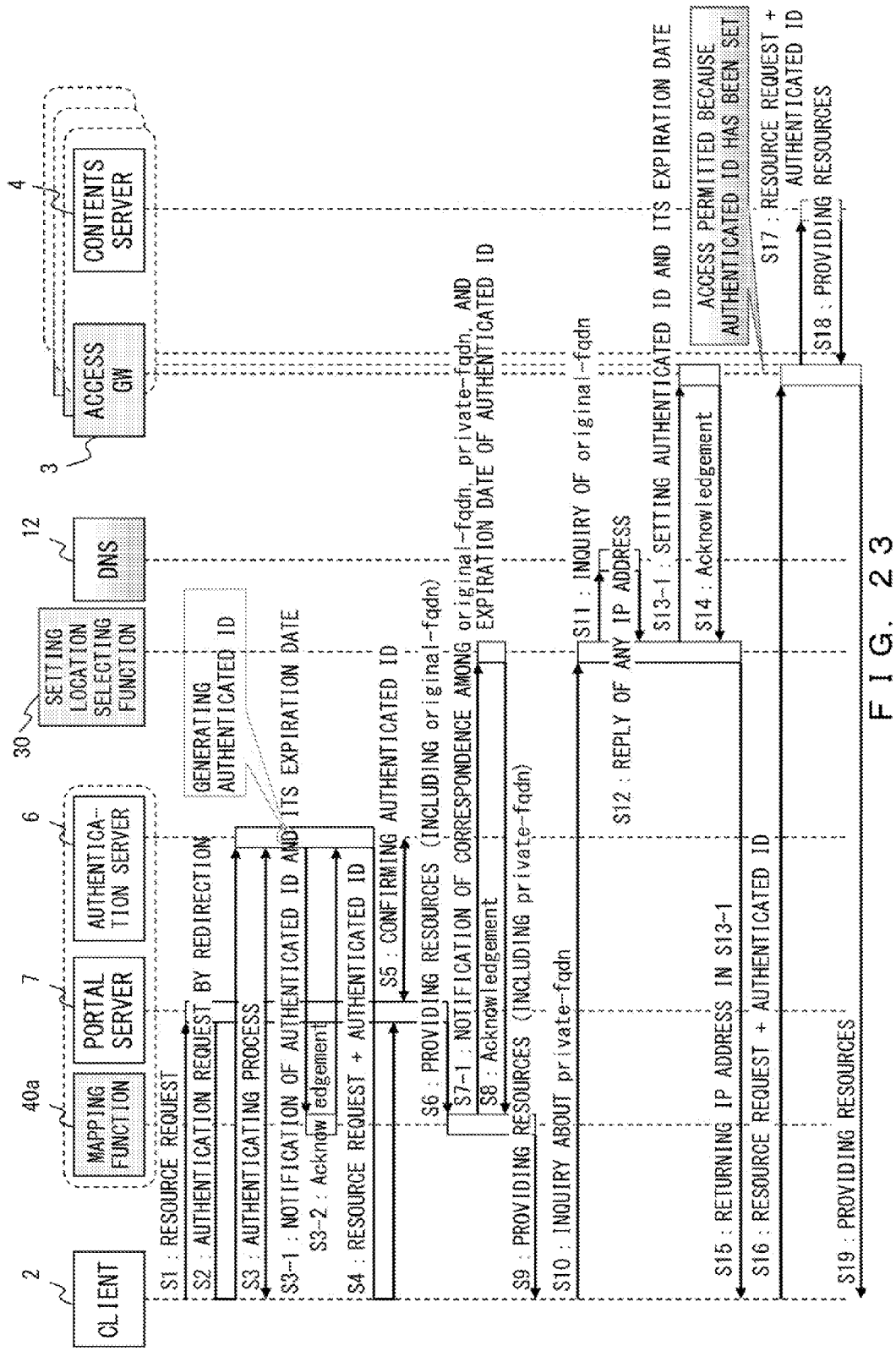
FIG. 23 is an example of the entire sequence of the access control system 20-2.

FIG. 23 is an example of the entire sequence of the access control system 20-2 according to the present embodiment. The processes in S1 through S3 are the same as the processes illustrated in FIG. 8.

In S3, when the authentication server 6 generates an authenticated ID, it sets the expiration date of the generated authenticated ID. Then, the authentication server 6 notifies the mapping function 40a of the authenticated ID and its expiration date (S3-1).

Upon receipt of the notification from the authentication server 6, the mapping function 40a stores the authenticated ID and the expiration date in the ID-FQDN management table 44a. Then, the mapping function 40a transmits an acknowledgement to the authentication server 6 (S3-2).

The processes in S4 through S6 are the same as the processes illustrated in FIG. 8.

Then, the mapping function 40a receives a message for providing resources such as a list of contents from the portal server 7 to the client 2. As described above with reference to S7 in FIG. 8, the mapping function 40a rewrites the FQDN of the contents server 7 in the message. Then, the mapping function 40 notifies the setting location selecting function 30a of the correspondence information among original-fqdn, private-fqdn, and the authenticated ID in the message, and the expiration date of the authenticated ID (S7-1).

The processes in S8 through S12 are the same as the processes illustrated in FIG. 8.

Then, the setting location selecting function 30a receives from the DNS server 12 a reply message in response to the inquiry from the client 2. The setting location selecting function 30a rewrites original-fqdn in the reply message into private-fqdn as described above with reference to S13 in FIG. 8. Then, the setting location selecting function 30a associates private-fqdn with the IP address in the reply message. The setting location selecting function 30a associates the authenticated ID with the IP address based on the correspondence between private-fqdn and the IP address in the reply message and the correspondence between private-fqdn notified in S7-1 and the authenticated ID. Then, the setting location selecting function 30a transmits a setting message for setting the authenticated ID including the expiration date to the IP address associated with the authenticated ID (that is, the access GW3) (S13-1).

The processes in S14 through S19 are the same as the processes illustrated in FIG. 8.

The expiration time management units 46 and 47 manage the expiration date of an authenticated ID, respectively. After the expiration date of an authenticated ID, the expiration time management unit 46 deletes an extraction relating to the authenticated ID after the expiration date from the ID-FQDN management table 44a. After the expiration date of an authenticated ID, the expiration time management unit 47 deletes the entry relating to the authenticated ID after the expiration date from the ID-FQDN table 26a, the FQDN conversion table 25a, and the ID address table 33a.

Figure 24:
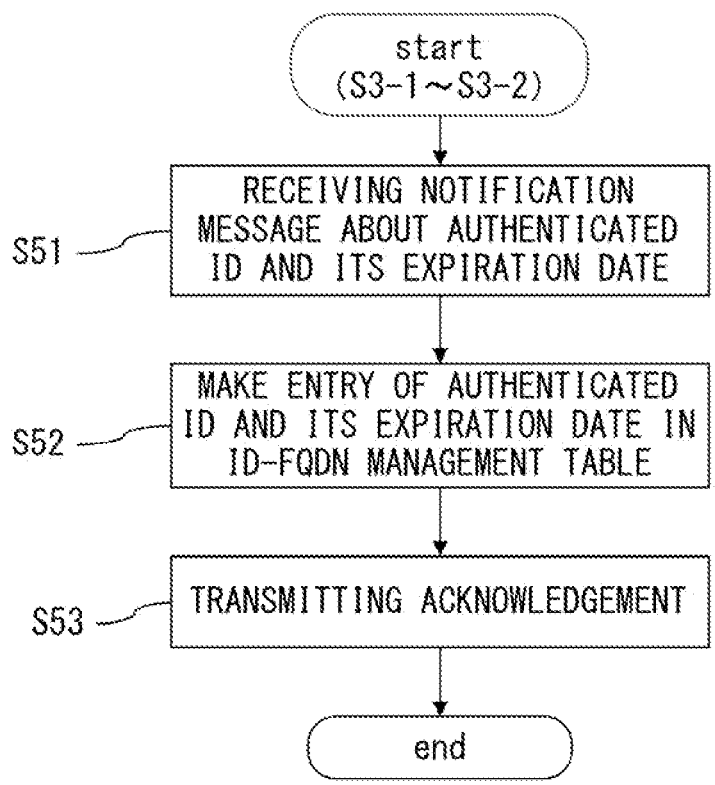
FIG. 24 is a flowchart of a mapping function 40a when a notification message about an authenticated ID and the expiry date of the ID are received from an authentication server 6.

FIG. 24 is a flowchart of the mapping function 40a when a notification message about an authenticated ID and the expiry date of the authenticated ID are received from the authentication server 6 according to the present embodiment. The flowchart in FIG. 24 illustrates the details of the processes in S3-1 through S3-2 in FIG. 23.

The notification acceptance unit 45 first receives the notification message 80 from the authentication server 6 (S51). FIG. 25 is an example of the notification message 80 for notification of the expiry date of an authenticated ID transmitted from the authentication server 6 to the mapping function 40a. As illustrated in FIG. 25, the notification message 80 has an authenticated ID and the expiration date of the authenticated ID.

The notification acceptance unit 45 enters the authenticated ID and its expiration date obtained from the notification message 80 in the ID-FQDN management table 44a (S52). FIG. 26 is an example of an ID-FQDN management table 44a. The ID-FQDN management table 44a is obtained by adding the data item "expiration date" to the ID-FQDN management table 44 in FIG. 13.

After entering the authenticated ID and its expiration date, the notification acceptance unit 45 transmits an acknowledgement to the authentication server 6 (S53).

The operations (S6 through S9) of the mapping function 40a performed when a response message for providing resources such as a list of contents from the portal server 7 is received are the same as in the flowchart in FIG. 9.

Described next is the operation of the setting location selecting function 30a. The operation of the setting location selecting function 30a is basically the same as the operation illustrated in FIG. 16. However, the "expiration date" of the authenticated ID is set in the notification message 60a (FIG. 27) transmitted to the setting location selecting function 30a from the mapping function 40a. The "expiration date" of the authenticated ID is also set in the ID-FQDN table 26a (FIG. 28), the FQDN conversion table 25a (FIG. 29), and the ID address table 33a (FIG. 30). The "expiration date" of the authenticated ID is also set in a setting message 61a (FIG. 31) transmitted from the setting location selecting function 30 to the access GW3.

After the "expiration date" of the authenticated ID, the expiration time management unit 46 deletes the entry including the "expiration date" from the ID-FQDN management table 44a. Similarly, after the "expiration date" of the authenticated ID, the expiration time management unit 47 deletes the entry including the "expiration date" from the ID-FQDN table 26a (FIG. 28), the FQDN conversion table 25a (FIG. 29), and the ID address table 33a (FIG. 30).

In FIG. 19, for example, assume that an inquiry about the converted FQDN corresponding to the authenticated ID is received from the client 2 after the expiration date of the authenticated ID (S41). However, there is no entry including the FQDN inquired about in the FQDN conversion table 25a (NO in S42). In this case, when the conversion management unit 22 transfers an inquiry message to the DNS server 12 (S43), and receives a reply message from the DNS server 12, the conversion management unit 22 transfers the reply message to the client 2 (S51). The reply message from the DNS server 12 is an error message notifying that there is no IP address corresponding to the FQDN.

According to the present embodiment, in addition to the effect of the first embodiment, an entry including its "expiration date" is deleted from all tables after its expiration date by providing the "expiration date" of an authenticated ID, thereby preventing an authenticated ID which is not used any more from being continuously entered. Therefore, the reliability of an authenticated ID can be enhanced. In addition, the capacity of a storage area is not unnecessarily used, thereby saving the memory resources.

Described next is the configuration in FIG. 32. FIG. 32 is an example of the configuration of the hardware of a computer for realizing the function of each unit of the gateway device including the mapping function 40, 40a, or the setting location selecting functions 30 and 30a.

In FIG. 32, a computer 90 includes a CPU 91, ROM 92, RAM 93, a hard disk device (HDD) 94, an interface device (I/F) 95, an input device 96, and an output device 97. These components are connected via a bus 98, and can mutually communicate various data under the management of the CPU 91.

The CPU 91 is a central processing device for controlling the operations of the entire gateway device including a gateway device including the mapping functions 40 and 40a or a gateway device including the setting location selecting functions 30 and 30a. The ROM (read only memory) 92 stores a control program for performing various controlling operations. The RAM (Random Access Memory) 93 provides a temporary storage area for work used as necessary when the CPU 91 executes a control program. The ROM 92 stores in advance a basic control program executed by the CPU 91. When the CPU 91 reads the basic control program stored in the ROM 92 and starts executing the program, each component of the computer 90 can be controlled.

The HDD 94 is a storage device for storing various control programs to be executed by the CPU 91, programs, data, tables, etc relating to the embodiments. For example, when the computer 90 is a gateway device including the mapping function 40 according to the first embodiment, the HDD 94 stores the rewrite location definition information 27, the ID storage location definition information 28, the setting location selecting function address information 43, and the ID-FQDN management table 44. For example, the computer 90 is a gateway device including the setting location selecting function 30 according to the first embodiment, the HDD 94 stores the ID address table 33, the ID-FQDN table 26, and the FQDN conversion table 25. For example, the computer 90 is a gateway device including the mapping function 40a according to the second embodiment, the HDD 94 stores the rewrite location definition information 27, the ID storage location definition information 28, the setting location selecting function address information 43, and the ID-FQDN management table 44a. In addition, for example, the computer 90 is a gateway device including the setting location selecting function 30a according to the second embodiment, the HDD 94 stores the ID address table 33a, the ID-FQDN table 26a, and the FQDN conversion table 25a.

The CPU 91 reads and executes a processing program (illustrated in, for example, FIGS. 9, 16, 19, 24, etc.) for realizing the mapping functions 40 and 40a or the setting location selecting functions 30 and 30a according to the embodiments above and stored in the hard disk device 94.

The I/F 95 manages the transmission and reception of various data between an external computer etc. and the computer 90. The input device 96 is, for example, a keyboard device and a mouse device. The output device 97 is, for example, a display unit, a printer, etc.

According to the embodiments above, the authenticating method is realized as follows. A conversion device (for example, the mapping functions 40 and 40a) receives first connection destination data (for example, an unconverted FQDN) and service data including the authentication information about an authenticated user and to be transmitted to the authenticated user (S6, S21).

The conversion device generates second connection destination data (for example, a converted FQDN) for designation of the first connection destination data (S24). The conversion device transmits the authentication information about the authenticated user, the first connection destination data, and the second connection destination data to a relay device (for example, the setting location selecting functions 30 and 30a) (S7, S25). Then, the relay device associates the authentication information about the authenticated user, the first connection destination data, and the second connection destination data and stores them in a storage device (S32). Then, the conversion device transmits the service data obtained by replacing the first connection destination data with the second connection destination data to a client device (for example, the client 2) operated by the authenticated user (S9, S26, S27). Then, the client device transmits to the relay device the replacing service data and the second connection destination data selected by the operation of the user (S10, S41). The relay device extracts from the storage unit the authentication information and the first connection destination data received from the conversion device corresponding to the second connection destination data transmitted from the client device (S42). The relay device transmits the extracted authentication information to the server device (for example, the access GW3) indicated by the extracted first connection destination data (S13, S50). The relay device transmits the address of the server device to the client device (S15, S51). The client device communicates with the server device using the address and the authentication information (S16).

With the configuration above, the frequency of setting the authenticated ID for the access GW when one authenticated ID is generated can be independent of the number of access GWs. Although a session is disconnected after an authenticated ID is issued and a client receives a message in which the FQDN is rewritten for each authenticated ID, the client can issue an inquiry request for the FQDN to a DNS server without receiving re-authentication.

The relay device does not transmit the authentication information if the authentication information has been transmitted to the server device.

With the above-mentioned configuration, when an authenticated ID is set for an access GW, it is not necessary to set again the authenticated ID for the access GW. Therefore, the frequency of setting the authenticated ID for the access GW can be reduced.

The conversion device and the relay device store the authentication information about the authenticated user, the first connection destination data associated with the authentication information, and the second connection destination data associated with the authentication information, and delete them after a predetermined time has passed. The deletion is performed by, for example, the expiration time management units 46 and 47 according to the present embodiment.

With the configuration above, if the "expiration date" of an authenticated ID is provided, an entry including the "expiration date" can be deleted from all tables when the expiration date passes.

The conversion device (for example, the gateway device 40-1) includes a reception unit (for example, the reception unit 40-2), a generation unit (for example, the generation unit 40-3), and a transmission unit (for example, the transmission unit 40-4). The reception unit receives service data to be transmitted to an authenticated user including the first connection destination data and the authentication information about the authenticated user. The generation unit generates the second connection destination data for designation of the first connection destination data. The transmission unit associates the authentication information about the authenticated user, the first connection destination data, and the second connection destination data, transmits them to the relay device (for example, the gateway device 30-1), and transmits the service data obtained by replacing the first connection destination data with the second connection destination data to the client device (for example, the client 2) operated by the authenticated user.

With the configuration above, the conversion device notifies the client and the setting location selecting function of the converted FQDN generated for each authenticated ID, thereby realizing the communication between the client and the setting location selecting function using the converted FQDN.

The relay device (for example, the gateway device 30-1) includes a reception unit (for example, the reception unit 30-2), a storage unit (for example, the storage unit 30-3), an extraction unit (for example, the extraction unit 30-4), and a transmission unit (for example, the transmission unit 30-5). The reception unit receives from a conversion device (for example, the gateway device 40-1) the authentication information about an authenticated user, the first connection destination data, and the second connection destination data. The reception unit receives the second connection destination data selected by the operation of a user from the client device operated by the user. The storage unit associates and stores the second connection destination data received from the conversion device, the authentication information, and the first connection destination data. The extraction unit extracts from the storage unit the authentication information and the first connection destination data received from the conversion device corresponding to the second connection destination data received from the client device. The transmission unit transmits the extracted authentication information to the server device indicated by the extracted first connection destination data, and transmits the address of the server device to the client device.

With the above-mentioned configuration, the relay device can communicate with the client using the converted FQDN, and with the access GW using the unconverted FQDN.

The present embodiment is not limited to the embodiment described above, but can be any embodiment with various configurations within the scope of the gist of the present embodiment.

According to the present embodiment, the frequency of setting the authentication information can be reduced for the server device when the authentication information is generated, and the authentication information can be set independent of the number of server devices.

All examples and conditional language recited herein are intended for pedagogical purpose to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method for authenticating a client device accessing a server system including a plurality of content servers and a plurality of access gateway servers, each of the plurality of access gateway servers corresponding to each of the plurality of content servers, the method comprising:
   receiving, by using a conversion device, service data which includes first connection destination data and authentication information about an authenticated user, and is transmitted to the authenticated user;
   generating, by using the conversion device, second connection destination data which designates the first connection destination data;
   associating, by using the conversion device, authentication information about the authenticated user, the first connection destination data, and the second connection destination data with one another, and transmitting the information and data to a relay device;
   associating, by using the relay device, the authentication information about the authenticated user, the first connection destination data, and the second connection destination data with one another, and storing the information and data in a storage device;
   transmitting, by using the conversion device, the service data in which the first connection destination data is replaced with the second connection destination data to the client device operated by the authenticated user;
   transmitting, by using the client device, the replaced service data and the second connection destination data selected by the operation of the user to the relay device;
   extracting, by using the relay device, from the storage unit the authentication information and the first connection destination data received from the conversion device and corresponding to the second connection destination data transmitted from the client device;
   transmitting, by using the relay device, the extracted authentication information to the access gateway server device specified by the extracted first connection destination data;
   transmitting, by using the relay device, the address of the access gateway server device to the client device; and
   accessing, by using the client device, the access gateway server device using the address and the authentication information to communicate with the content server corresponding to the access gateway server device.

2. The method according to claim 1, wherein
   the relay device does not transmit the authentication information if the authentication information has been transmitted to the access gateway server device.

3. The method according to claim 1, wherein
   the conversion device and the relay device store the authentication information about the authenticated user, the first connection destination data associated with the authentication information, and the second connection destination data associated with the authentication information, and delete the authentication information, the first connection destination data and the second connection destination data after a predetermined time.

4. An authenticating system for authenticating a client device accessing a server system including a plurality of content servers and a plurality of access gateway servers, each of the plurality of access gateway servers corresponding to each of the plurality of content servers, the authenticating system comprising:
   a conversion device; and
   a relay device, wherein
   the conversion device receives service data which includes first connection destination data and authentication information about an authenticated user, and is transmitted to the authenticated user,
   the conversion device generates second connection destination data which designates the first connection destination data,
   the conversion device associates authentication information about the authenticated user, the first connection destination data, and the second connection destination data with one another, and transmitting the associated to the relay device,
   the relay device associates the authentication information about the authenticated user, the first connection destination data, and the second connection destination data with one another, and storing the associated in a storage device,
   the conversion device transmits the service data in which the first connection destination data is replaced with the second connection destination data to the client device operated by the authenticated user,
   the client device transmits the replaced service data and the second connection destination data selected by the operation of the user to the relay device,
   the relay device extracts from the storage unit the authentication information and the first connection destination data received from the conversion device and corresponding to the second connection destination data transmitted from the client device,
   the relay device transmits the extracted authentication information to the access gateway server device specified by the extracted first connection destination data, the relay device transmits the address of the access gateway server device to the client device and the client device accesses the access gateway server device using the address and the authentication information to communicate with the content server corresponding to the access gateway server device.

\* \* \* \* \*